(12) United States Patent
Aida et al.

(10) Patent No.: US 12,374,354 B2
(45) Date of Patent: *Jul. 29, 2025

(54) INFORMATION PROCESSING DEVICE

(71) Applicant: RevComm Inc., Tokyo (JP)

(72) Inventors: Takeshi Aida, Tokyo (JP); Takekatsu Hiramura, Tokyo (JP)

(73) Assignee: RevComm Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,787

(22) Filed: Dec. 6, 2023

(65) Prior Publication Data

US 2024/0105212 A1 Mar. 28, 2024

Related U.S. Application Data

(63) Continuation of application No. 17/433,987, filed as application No. PCT/JP2020/010634 on Mar. 11, 2020, now Pat. No. 11,862,190.

(30) Foreign Application Priority Data

Mar. 11, 2019 (JP) ................................. 2019-043549

(51) Int. Cl.
  *G10L 21/02* (2013.01)
  *G10L 25/54* (2013.01)
  (Continued)

(52) U.S. Cl.
  CPC .............. *G10L 25/78* (2013.01); *G10L 25/54* (2013.01); *G10L 25/63* (2013.01);
  (Continued)

(58) Field of Classification Search
  CPC ......... G10L 25/78; G10L 25/63; G10L 25/54; G10L 15/22; G10L 2015/221;
  (Continued)

(56) References Cited

U.S. PATENT DOCUMENTS

| 5,983,186 A | * | 11/1999 | Miyazawa | .............. G10L 15/26 |
| | | | | 704/E15.045 |
| 7,155,207 B2 | | 12/2006 | Chapman et al. | |

(Continued)

FOREIGN PATENT DOCUMENTS

| JP | 2002-269335 A | 9/2002 |
| JP | 2011-102862 A | 5/2011 |

(Continued)

OTHER PUBLICATIONS

World Intellectual Property Organization, International Search Report for international application No. PCT/JP2020/010634, mail date Jun. 2, 2020, 4 total pages.

(Continued)

*Primary Examiner* — Md S Elahee
(74) *Attorney, Agent, or Firm* — Maier & Maier, PLLC

(57) ABSTRACT

The present invention addresses the problem of providing a technique for assisting the realization of more efficient business activities, while taking account of objective indicators. In a server 1 which supports a user U having a telephone call with a call destination C, an acquiring unit 101 acquires information recorded during the call between the user U and the call destination C, as call information. An extracting unit 102 detects utterance segments VS1 to VSn in which speech is present, from the acquired call information, and extracts speech information VI1 to VIm from each utterance segment VS1 to VSn. An analyzing unit 103 performs analysis based on elements E1 to Ep, on the basis of the extracted speech information VI1 to VIm. A generating unit 104 generates business support information for supporting the call with the user U, on the basis of the results of the analysis. A presenting unit 105 presents the generated business support information to the user U. The abovementioned problem is thus resolved.

20 Claims, 13 Drawing Sheets

(51) Int. Cl.
  *G10L 25/63* (2013.01)
  *G10L 25/78* (2013.01)
  *H04M 3/428* (2006.01)
  *H04M 3/51* (2006.01)

(52) U.S. Cl.
  CPC ....... *H04M 3/4283* (2013.01); *H04M 3/5175* (2013.01); *H04M 2201/40* (2013.01)

(58) Field of Classification Search
  CPC .. H04M 1/656; H04M 1/2748; H04M 3/5175; H04M 3/4283; H04M 2201/40; H04M 3/42221; H04M 2203/555; G06Q 40/02; G06F 3/1238
  See application file for complete search history.

(56) References Cited

U.S. PATENT DOCUMENTS

| | | | |
|---|---|---|---|
| 8,249,229 | B2 | 8/2012 | Houmura et al. |
| 8,989,368 | B1 | 3/2015 | Rivier et al. |
| 2004/0096043 | A1 | 5/2004 | Timmins et al. |
| 2007/0248327 | A1 | 10/2007 | Chen |
| 2017/0134580 | A1 | 5/2017 | Solvacek |
| 2020/0219183 | A1 | 7/2020 | Cho et al. |
| 2022/0405031 | A1* | 12/2022 | Araki .................... G06F 3/1238 |

FOREIGN PATENT DOCUMENTS

| | | |
|---|---|---|
| JP | 2013-157666 A | 5/2013 |
| JP | 2014178567 A | 9/2014 |
| JP | 2016-076788 A | 5/2016 |
| JP | 2017-010374 A | 1/2017 |
| JP | 6572354 B1 | 8/2019 |
| WO | 2020/184631 A1 | 9/2020 |

OTHER PUBLICATIONS

Yokoyama Takahiko, Judgment on Erection by using language information and non-language information in a plurality of discourse, eighteenth annual meeting published by language processing society assembly [CD-ROM], Japan, Language Processing Society, Mar. 13, 2012, p. 291-p. 294.
Singapore Intellectual Property Office, Examiner Written Opinion for application No. 11202109138V, mail date Nov. 14, 2022, 12 total pages.
Sachiko Onodera, sixty seventh (2005) National Conference collection (2) Artificial Intelligence and Cognitive Science Mar. 2, 2005, pp. 2-125, to pp. 2-126.
Notification of Reasons for Refusal issued in the JP Patent Application No. 2020-549075, mailed on Oct. 19, 2021.

* cited by examiner

FIG. 5

| F1 | F2 |
|---|---|
| (search) | USER U1<br>OCTOBER 25, 2018, 15:25 – OCTOBER 25, 2018, 15:27  ○○ SPORTS ○○··· |

F1 list:
- ■ USER U2
  - ■ OCTOBER 25, 2018, 10:04
  - ■ ○○ CORPORATION ■ ○○
  - ■ 03-XXXX-XXXX ■ 1:56
- ■ USER U3
  - ■ OCTOBER 25, 2018, 09:03
  - ■ ○○ CO., LTD.  ■ ○○
  - ■ 03-XXXX-XXXX ■ 2:12
- ■ USER U4
  - ■ OCTOBER 25, 2018, 08:57
  - ■ ○○ CLINIC  ■ ○○
  - ■ 03-XXXX-XXXX ■ 2:02
- ■ USER U5
  - ■ OCTOBER 24, 2018, 11:15
  - ■ ○○ CORPORATION ■ ○○
  - ■ 03-XXXX-XXXX ■ 2:14
- ■ USER U6
  - ■ OCTOBER 24, 2018, 10:32
  - ■ ○○ CO., LTD.  ■ ○○
  - ■ 03-XXXX-XXXX ■ 2:16
- ■ USER U7
  - ■ OCTOBER 24, 2018, 09:26
  - ■ ○○ CORPORATION ■ ○○
  - ■ 03-XXXX-XXXX ■ 3:19
- ■ USER U8
  - ■ OCTOBER 23, 2018, 10:44
  - ■ ○○ CO., LTD.  ■ ○○
  - ■ 03-XXXX-XXXX ■ 5:56
- ■ USER U9
  - ■ OCTOBER 23, 2018, 10:21
  - ■ ○○ CORPORATION ■ ○○
  - ■ 03-XXXX-XXXX ■ 1:23
- ■ USER U10
  - ■ OCTOBER 23, 2018, 09:46
  - ■ ○○ CORPORATION ■ ○○
  - ■ 03-XXXX-XXXX ■ 2:45
- ■ USER U11
  - ■ OCTOBER 23, 2018, 09:36
  - ■ ○○ CO., LTD.  ■ ○○
  - ■ 03-XXXX-XXXX ■ 1:37

F2:

☐ APPOINTMENT SUCCESSFULLY ACQUIRED  ☐ OTHER COMPANY'S SERVICE X BEING USED  + ADDITION OF TELEPHONING MEMO

SPEECH (graph showing waveforms L1, L2 with markers Z1, P1, P2, Z2, Z3, labeled KEYWORD, SILENCE, SILENCE, OVERLAPPING) B51

▶ PLAYBACK ‖ STOP  💬 COMMENTS  ▶▶ PLAYBACK SPEED  ⚠ DOWNLOAD

TELEPHONING ASSESSMENT

| TOTAL SCORE | Talk:Listen RATIO | SILENCE COUNT | OVERLAPPING COUNT | KEYWORD COUNT |
|---|---|---|---|---|
| 4.7 | 63:37 | TWICE | ONCE | TWICE |

SPEECH ASSESSMENT

| BASIC FREQUENCY (USER) | BASIC FREQUENCY (CALL DESTINATION) | INFLECTION STRENGTH(USER) | INFLECTION STRENGTH (CALL DESTINATION) |
|---|---|---|---|
| 246.35Hz | 86.94Hz | 0.3 | 0.1 |

SPEAKING SPEED

| USER | CALL DESTINATION |
|---|---|
| 10.30 LETTERS/SEC | 6.08 LETTERS/SEC |

KEYWORD APPEARANCE

| TIME | KEYWORD |
|---|---|
| 1:23 | KEYWORD w1 |
| 1:36 | KEYWORD w1 |

COMMENTS

○○ ○○    OCTOBER 27, 2018, 22:58
It seems that the person in charge changed from ○○ to ○○ at 1:00 due to an internal transfer.
SHARE  EDIT  DELETE ○○ ○○    OCTOBER 27, 2018, 23:00
According to 2:35–3:00, they are currently using other company's service, but are dissatisfied with the service, and thus they are considering introducing our service. According to 5:00, the maximum number of users is expected to be 1300.
SHARE  EDIT  DELETE

FIG. 6

☐ TELEPHONING MEMO

T31
- ☑ APPOINTMENT SUCCESSFULLY ACQUIRED
- ☐ ABSENCE OF PERSON IN CHARGE
- ☐ CALLBACK
- ☐ RESIGNATION OF PERSON IN CHARGE
- ☐ CONTINUOUS FOLLOW-UP
- ☐ NO NEEDS
- ☑ OTHER COMPANY'S SERVICE X BEING USED
- ☐ OTHER COMPANY'S SERVICEY BEING USED

⋮

F3

B41 — + ADD ITEM

B42 — ✓ REGISTER

TELEPHONING MEMO

If the telephoning memo function is set, a telephoning memo can be registered after the call is over.

T51 — ☑ ENABLE TELEPHONING MEMO

R

| | ITEM | T61 |
|---|---|---|
| 1 | APPOINTMENT SUCCESSFULLY ACQUIRED | ☑ MARK AS POSITIVE TELEPHONING |
| 2 | ABSENCE OF PERSON IN CHARGE | ☐ MARK AS POSITIVE TELEPHONING |
| 3 | CALLBACK | ☐ MARK AS POSITIVE TELEPHONING |
| 4 | RESIGNATION OF PERSON IN CHARGE | ☐ MARK AS POSITIVE TELEPHONING |
| 5 | CONTINUOUS FOLLOW-UP | ☐ MARK AS POSITIVE TELEPHONING |
| 6 | NO NEEDS | ☐ MARK AS POSITIVE TELEPHONING |
| 7 | OTHER COMPANY'S SERVICE X BEING USED | ☐ MARK AS POSITIVE TELEPHONING |
| 8 | OTHER COMPANY'S SERVICE Y BEING USED | ☐ MARK AS POSITIVE TELEPHONING |
| 9 | | |

F5, F6

FIG. 13
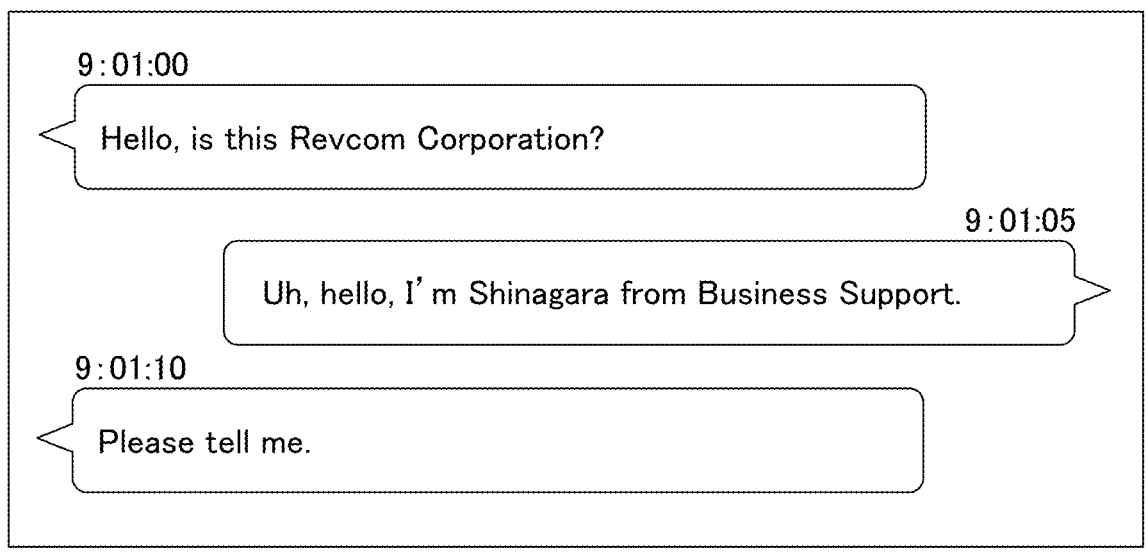
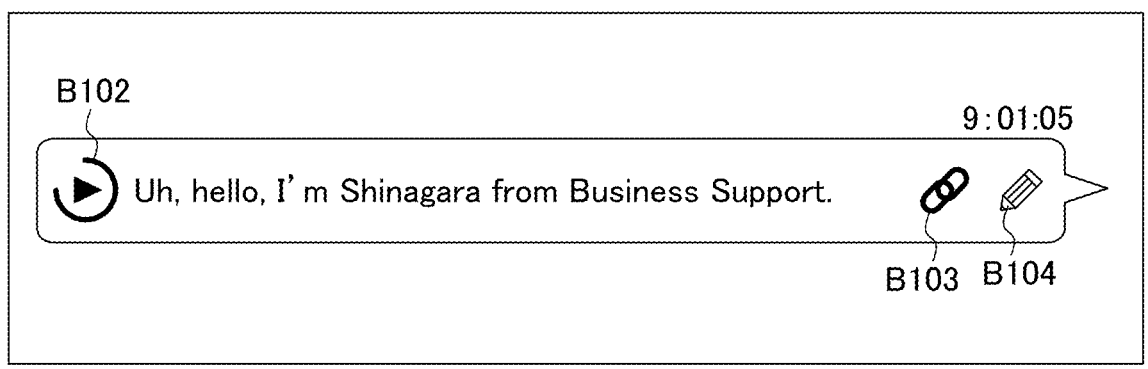
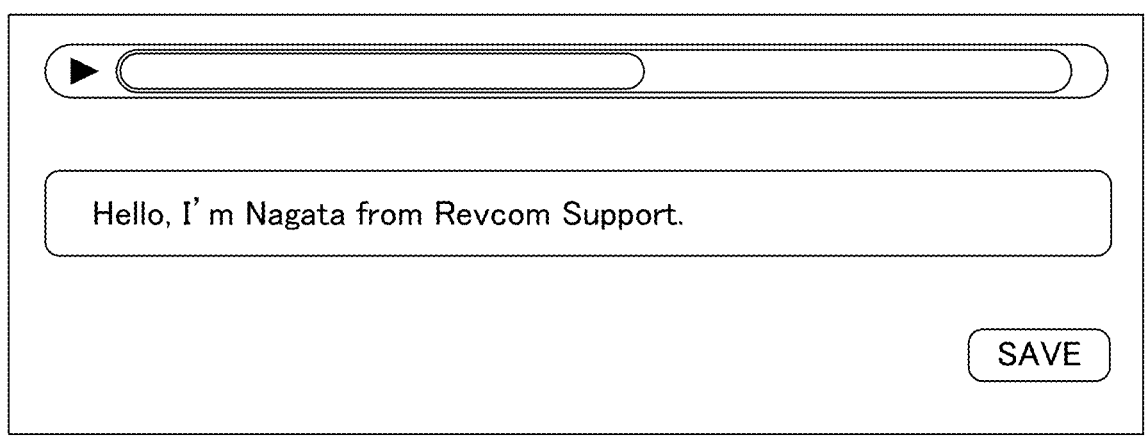

INFORMATION PROCESSING DEVICE

RELATED APPLICATION INFORMATION

This patent is a continuation of U.S. patent application Ser. No. 17/433,987, filed Aug. 25, 2021, entitled INFORMATION PROCESSING DEVICE, which claims priority from International PCT Patent Application No. PCT/JP2020/010634, filed Mar. 11, 2020 entitled, "INFORMATION PROCESSING DEVICE", which claims priority to Japanese Patent Application No. 2019-043549, filed Mar. 11, 2019 all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD

The present invention relates to an information processing device.

BACKGROUND ART

Conventionally, sales activities using telephones are generally conducted, and there is a technique for supporting such activities (e.g., Patent Document 1).

Patent Document 1: Japanese Unexamined Patent Application, Publication No. 2002-269335

DISCLOSURE OF THE INVENTION

Problems to be Solved by the Invention

In the conventional technique including the technique described in Patent Document 1, when assessing sales activities by telephone, it is generally performed based on the subjective view of a superior or the like who manages sales activities. Therefore, the objective assessment of sales activities is limited to sales performance (e.g., contract rate, number of contracts), assessment from customers (e.g., questionnaire), and the like. As a result, the training of salesperson needs to be performed individually by a superior or the like or in-house training and lectures need to be held, which are costly.

The present invention has been made in view of such circumstances, and an object of the present invention is to assist the realization of more efficient sales activities while considering objective indicators.

Means for Solving the Problems

To achieve the above object, a display control device according to one aspect of the present invention includes an information processing device for supporting a user who calls a call destination. The information processing device includes:

an acquiring unit that acquires information recorded during a call between the user and the call destination as call information;
an extracting unit that detects speaking sections in which speech exists from the acquired call information and extracts speech information for each speaking section;
an analyzing unit that performs analysis based on one or more elements based on the extracted one or more pieces of the speech information;
a generating unit that generates support information that supports the call of the user based on a result of the analysis; and
a presenting unit that presents the generated support information to the user.

The one or more elements may include information on an on-hold tone.

The one or more elements may include information on a sound signal.

The one or more elements may further include information on letters in the speaking section.

The support information may include at least one of the following: a speaking style of the user, a content spoken by the call destination, or advice for the user.

Effects of the Invention

According to the present invention, it is possible to assist the realization of more efficient sales activities while considering objective indicators.

THE DRAWINGS

FIG. 5 shows a specific example of sales support information generated by the management server;

FIG. 6 shows a specific example of a telephoning memo selection registration screen included in the sales support information in FIG. 5;

FIG. 7 shows a specific example of a telephoning memo setting screen;

FIG. 13 shows a specific example of a correction function of a speech recognition result.

PREFERRED MODE FOR CARRYING OUT THE INVENTION

Hereinafter, an embodiment of the present invention will be described with reference to the drawings as appropriate.
[Service Outline]

Figure 1:
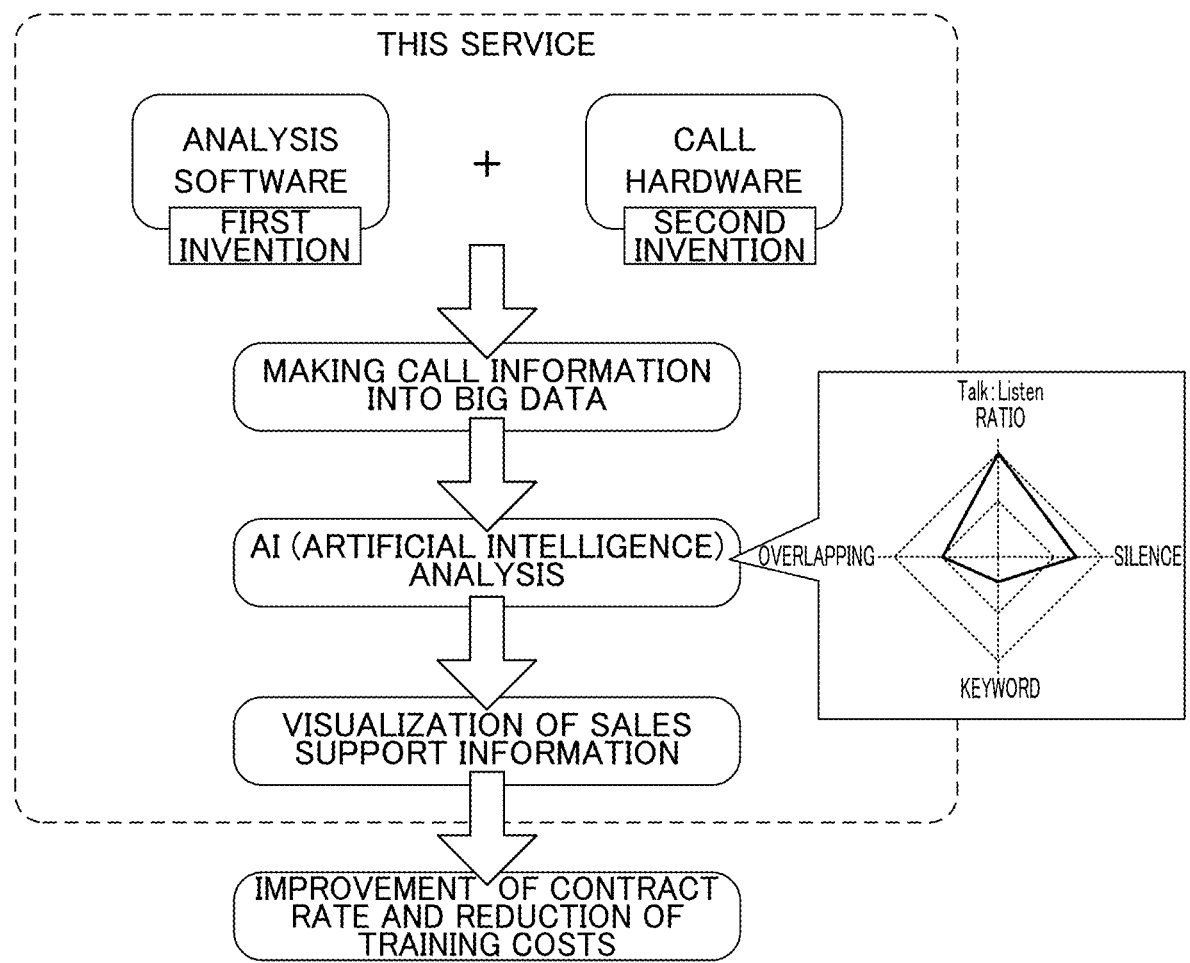
FIG. 1 is an image diagram showing an outline of a sales support service that can be realized by an information processing system including a management server of an information processing device according to an embodiment of the present invention.

FIG. 1 is an image diagram showing an outline of a sales support service (hereinafter referred to as "this service") that can be realized by an information processing system including a management server 1 of an information processing device according to an embodiment of the present invention.

First, the outline of this service to which the information processing system in FIG. 2 described later is applied, will be described with reference to FIG. 1.

This service provides information for supporting telephone sales (hereinafter referred to as "sales support information") to a person (hereinafter referred to as "user") who conducts sales business (hereinafter referred to as "telephone sales") using calling means such as a telephone. Here, the concept of the "call" is not limited to the exchange of speech by a general telephone, but includes the exchange of speech and silence through communication. The "speech" means a sound (voice) that a person utters through a vocal organ, and typically includes, for example, voices and the like exchanged between a user U and a call destination C through a telephone. In addition, the "speech" in the present specification includes various sounds that may be generated in connection with a call, for example, an on-hold tone, ambient noise, and the like.

As shown in FIG. 1, in this service, analysis software (first invention) and call hardware (second invention) are used. By using the analysis software, it is possible to analyze and assess the contents of the telephone sales of the user, and by using the call hardware, telephone sales by the user becomes possible. As a result, it is possible to increase profits and reduce costs both qualitatively and quantitatively.
[First Invention]
(Analysis Software)

In this service, information on a call between the user and a person whom the user calls or receives a call from (hereinafter referred to as a "call destination") is stored as call information and made into big data. The call information made into big data is subjected to analysis by AI (artificial intelligence), and sales support information is generated based on the result of the analysis.

By using the analysis software in this service, all incoming and outgoing logs can be stored in a cloud (the management server 1 in FIG. 2) and saved, so that a huge amount of call information can be stored as big data. As a result, the big data can be utilized for processing using AI (artificial intelligence). Specifically, for example, AI (artificial intelligence) can feed back a user's call in real time, so that the quality of telephone sales can be improved, and the contract rate can be improved. In addition, in the course of business, a person who manages users (hereinafter referred to as a "manager"), such as a person who is in a managerial position or a supervisor, can monitor the operating status of all the users, who are managed, in real time, and can therefore provide accurate instructions and training with "good points" and "bad points".

Since the history of telephoning is automatically created, it is possible to easily access the call information in which customer data and contract information are linked. Therefore, this service can be linked with customer relationship management (CRM). Since this service can be linked with a database or the like separately managed in a company, collective management of in-house systems can be realized.

Call information made into big data can also be tagged with keywords. That is, by using speech recognition, when the appearance of a pre-registered keyword has been detected, the detected keyword and information of the location of appearance can be appended. Moreover, it is possible to analyze the ratio between the speaking time of the user and that of the call destination (Talk:Listen ratio), an overlapping count, a silence count, a speech speed (hereinafter referred to as a "speaking speed"), speech recognition results, an automatically summarized document, and the like. It is also possible to analyze the contents of a call. Since the contents of a call can be transcribed, the user can focus on the conversation with the call destination without inputting or taking notes. Fillers (e.g., stammering, such as "uh" and "um") in sentences of speech recognition results can be identified and removed. As a result, the readability of the speech recognition results can be improved. A specific example in which fillers in sentences of speech recognition results are identified and removed will be described later with reference to FIG. 10.

As a result, the user using this service can solve the following existing problems by utilizing the sales support information. That is, the problems solved by utilizing the sales support information are as follows: "it is unknown how to conduct telephone sales because know-how for telephone sales has not been accumulated", "a cause why an order has been missed (hereinafter referred to as a 'lost order') is not investigated", "it is not possible to transmit nuance or personality to a call destination in detail", and "it is troublesome to call a customer while checking customer information".

The manager can solve the following existing problems by utilizing the sales support information. That is, the problems solved by utilizing the sales support information are as follows: "it is not possible to identify by whom and why a lost order has occurred", "there is no way for other users to learn efficiently the conversation skills of a user with excellent sales performance", and "when trouble occurs, it is difficult to check past call records". Further, according to this service, since operations such as the change of various settings are easy, the problem that "the change of the incoming call setting in the absence of the user or outside the business hours is troublesome" can be easily solved.

The sales support information provided to the user using this service is "visualized" by a dashboard function using a graph or specific numerical values. Thus, it is possible to analyze all users' calls. Specifically, for example, although not shown in the drawings, it is possible to show comparing the performance of each salesperson (user) in charge, comparing with numerical values those of a telephoning in which a business negotiation has succeeded, and what kind of indicators are diverging by comparing with another salesperson (user) who has similar business negotiation strategies. This allows users to cooperate with each other or engage in friendly competition to improve the productivity of the entire organization.

As described above, according to this service, when training users who are managed, the manager (not shown) can train the users inexpensively and efficiently by utilizing the sales support information. In addition, the user can utilize the support information in real time in a call with a call destination. As a result, it is possible to improve the contract rate while reducing the cost of training the user (salesperson).

(System Configuration)

The configuration of the information processing system that realizes the provision of this service shown in FIG. 1 will be described. FIG. 2 shows the configuration of the information processing system including the management server 1 of the information processing device according to the embodiment of the present invention.

Figure 2:
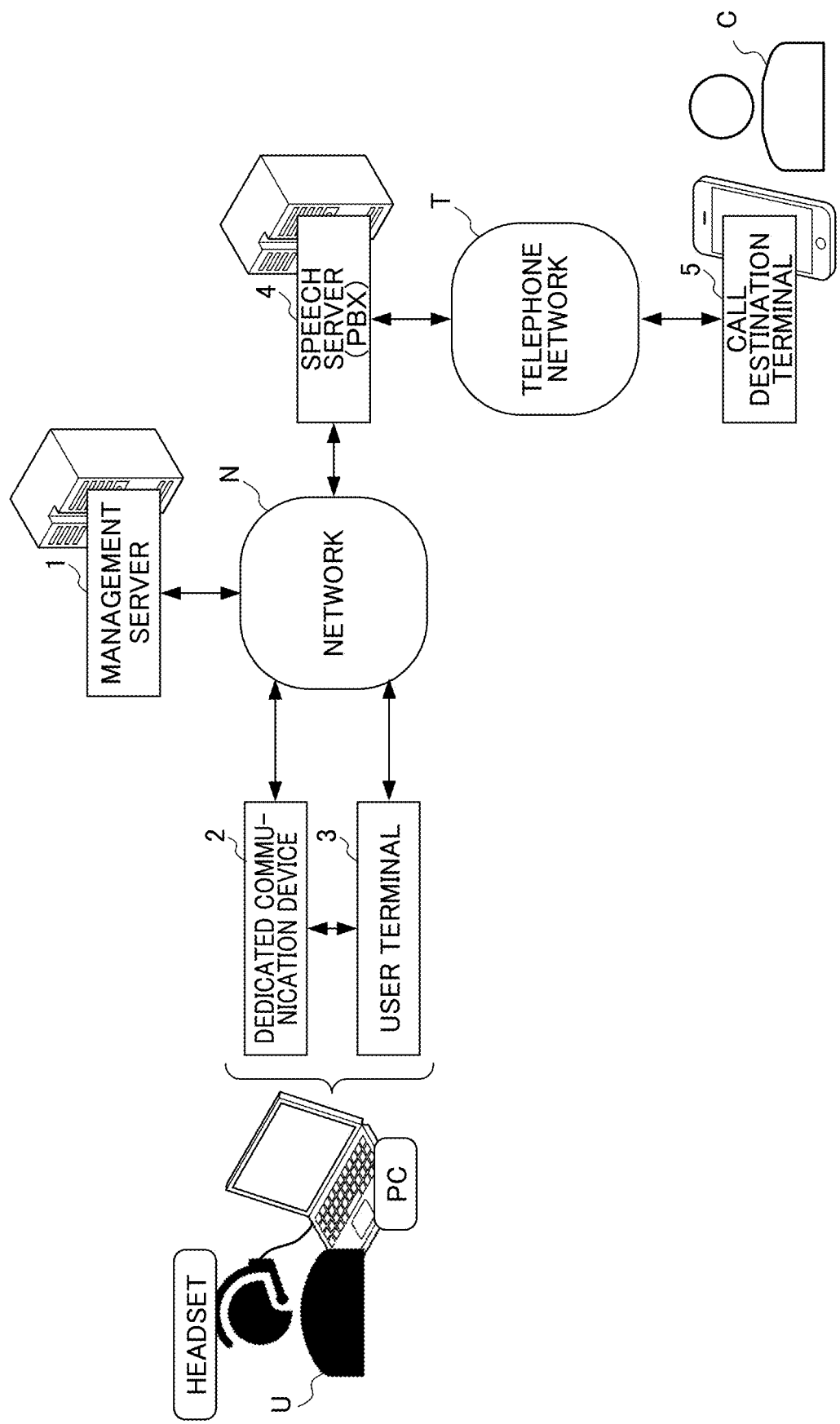
FIG. 2 shows the configuration of the information processing system including the management server of the information processing device according to the embodiment of the present invention.

The information processing system shown in FIG. 2 includes the management server 1, a dedicated communication device 2, a user terminal 3, a speech server (PBX/Private Branch eXchanger) 4, and a call destination terminal 5. The management server 1, the dedicated communication device 2, the user terminal 3, and the speech server (PBX) 4 are connected to each other via a predetermined network N such as the Internet. The speech server (PBX) 4 is connected to the call destination terminal 5 via a telephone network T.

(Management Server)

The management server 1 is an information processing device managed by a service provider (not shown). The management server 1 executes various processes for realizing this service while appropriately communicating with the dedicated communication device 2, the user terminal 3, and the speech server (PBX) 4.

Specifically, the management server 1 detects sections where speech exists (hereinafter referred to as "speaking sections") VS1 to VSn (n is an integer value of 1 or more) from call information recorded in a call between the user U and the call destination C, and extracts speech information VI1 to VIm (m is an integer value of 1 or more) for the speaking sections VS1 to VSn, respectively. For each of the extracted speech information VI1 to VIm, voice, an on-hold tone, and other noises are discriminated. A specific method for discriminating these is not limited. For example, it may be discriminated by machine learning or deep learning using a signal processing technique or AI (artificial intelligence). Hereinafter, when it is not necessary to distinguish between the speaking sections VS1 to VSv, these sections are collectively referred to as a "speaking section VS". Further, when it is not necessary to distinguish between the speech information VI1 to VIm, these are collectively referred to as "speech information VI".

The management server 1 performs analysis based on elements E1 to Ep (p is an integer value of 1 or more) based on the extracted speech information VI, and generates sales support information based on the result of the analysis. Hereinafter, when it is not necessary to distinguish the elements E1 to Ep, these elements are collectively referred to as an "element E".

Note that the content of the element E is not limited. For example, when analysis is performed using information on "on-hold tone" as an element E, the extracted speech information VI is analyzed for the duration and count of on-hold tones. When analysis is performed using information on "locations where only the user U is speaking" as an element E, the extracted speech information VI is analyzed for the duration, the count, or the contents of the locations where the user U is speaking. When analysis is performed using information on "locations where only the call destination C is speaking" as an element E, the extracted speech information VI is analyzed for the duration, the count, or the contents of the locations where the call destination C is speaking. When analysis is performed using information on "locations where overlapping occurs" as an element E, the extracted speech information VI is analyzed for the duration, the count, or the contents of the locations where the speaking of the user U and that of the call destination C simultaneously occur (overlap). When analysis is performed using information on "locations where silence occurs" as an element E, the extracted speech information VI is analyzed for the duration and count of the locations where neither the user U nor the call destination C is speaking (silent locations).

The management server 1 presents the generated sales support information to the user U. The management server 1 simply executes control for transmitting the sales support information to the user terminal 3. Then, the user terminal 3 outputs acquired sales support information, and the user recognizes the sales support information. In this sense, in the present specification, the management server 1 can present generated sales support information to the user U.

(Dedicated Communication Device)

The dedicated communication device 2 controls making calls from the user U to the call destination C, and receiving calls from the call destination C to the user U. The dedicated communication device 2 may include an independent housing, or some or all of the functions may be mounted on the user terminal 3 (e.g., the PC drawn in FIG. 2) described later. The dedicated communication device 2 may be mounted on a headset of the user U (e.g., the headset drawn in FIG. 2). The aspect of the dedicated communication device 2 will be described later in the description of a second invention.

(User Terminal)

The user terminal 3 is an information processing device operated by the user U to conduct telephone sales, and is composed of, for example, a personal computer, a smartphone, a tablet, or the like. The user terminal 3 displays sales support information generated by the management server 1. As a result, the user U can utilize the sales support information displayed on the user terminal 3 in his/her own telephone sales.

Various application programs (hereinafter referred to as an "app") for receiving the provision of this service are installed in the user terminal 3. In the following description, unless otherwise specified, "the user U operates the user terminal 3" means that the user U activates apps installed in the user terminal 3 to perform various operations.

(Speech Server (PBX))

The speech server 4 functions as an exchange that enables calls between the dedicated communication device 2 and the call destination terminal 5 by connecting the network N and the telephone network T to each other. When the call destination C calls the user U, the speech server 4 transmits a message indicating this (hereinafter referred to as an "incoming call notification message") to an app of the dedicated communication device 2. The speech server 4 transmits an incoming call notification message to a code snippet (hereinafter referred to as "beacon") incorporated in a website and a software development kit (SDK).

(Call Destination Terminal)

The call destination terminal 5 is an information processing terminal operated when the call destination C calls the user U, and is composed of, for example, a smartphone, a fixed phone, or the like.

Since the information processing system including the management server 1 has the above-described configuration, in the course of business, when training users who are managed, the manager can train the users inexpensively and efficiently by utilizing the sales support information. The user can utilize the support information in real time in a call with the call destination. As a result, it is possible to improve the contract rate while reducing the cost of training the user (salesperson).

(Hardware Configuration)

Figure 3:
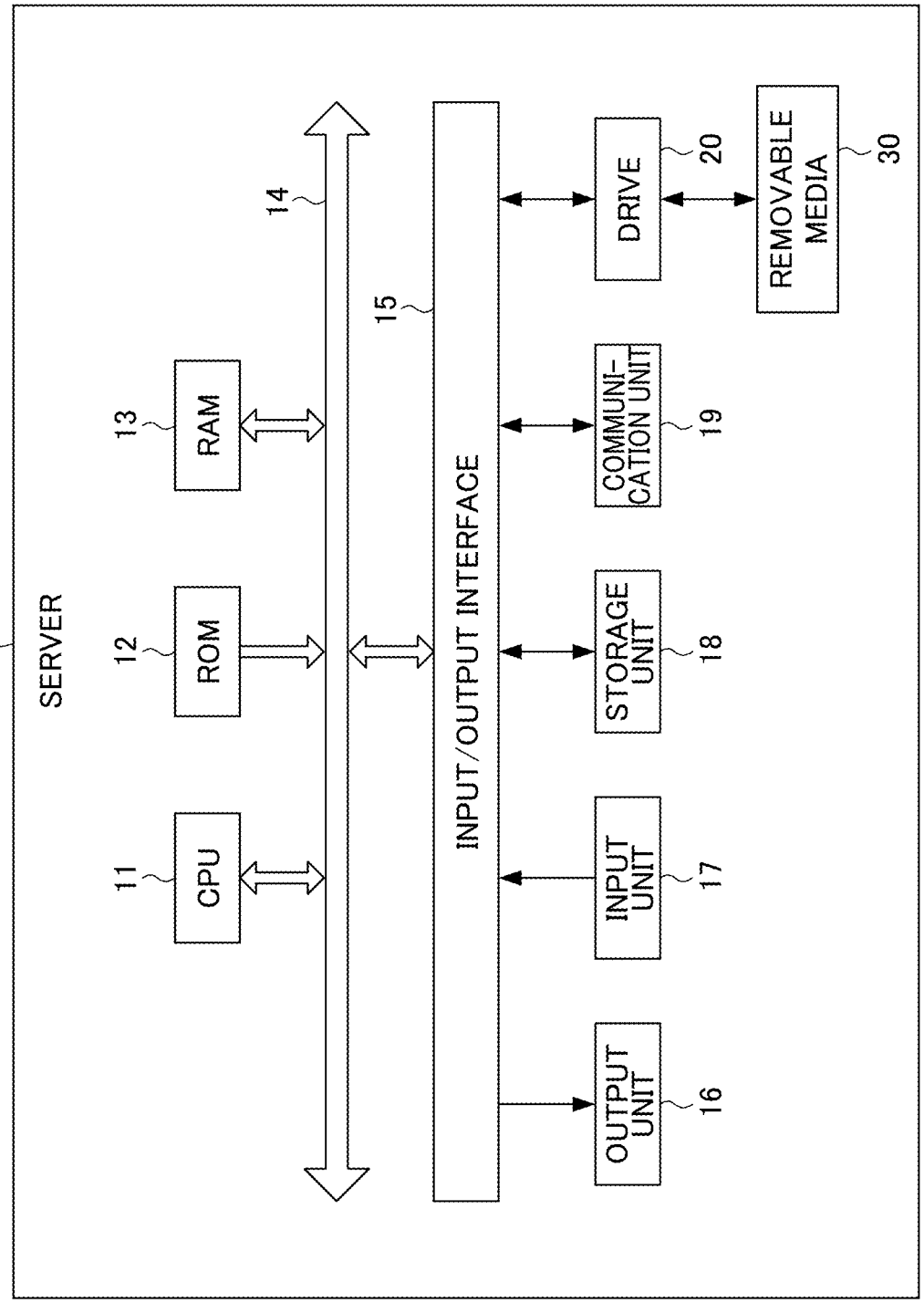
FIG. 3 is a block diagram showing an example of the hardware configuration of the management server constituting the information processing system in FIG. 2.

FIG. 3 is a block diagram showing an example of the hardware configuration of the management server 1 constituting the information processing system in FIG. 2.

The management server 1 includes a CPU (central processing unit) 11, a ROM (read only memory) 12, a RAM (random access memory) 13, a bus 14, an input/output interface 15, an output unit 16, an input unit 17, a storage unit 18, a communication unit 19, and a drive 20.

The CPU 11 executes various processes according to a program recorded in the ROM 12 or a program loaded from the storage unit 18 into the RAM 13. In the RAM 13, data required for the CPU 11 to perform various processes is also stored as appropriate.

The CPU 11, the ROM 12 and the RAM 13 are connected to each other via the bus 14. The input/output interface 15 is also connected to the bus 14. The output unit 16, the input unit 17, the storage unit 18, the communication unit 19, and the drive 20 are connected to the input/output interface 15.

The output unit 16 is composed of a liquid crystal display or the like, and displays various images. The input unit 17 is composed of various hardware buttons and the like, and inputs various information according to an instruction operation of an operator.

The storage unit 18 is composed of a DRAM (dynamic random access memory) or the like, and stores various data. The communication unit 19 controls communication with other devices (the dedicated communication device 2, the user terminal 3, and the speech server (PBX) 4) via the network N including the Internet.

The drive 20 is provided as necessary. A removable medium 30 composed of a magnetic disk, an optical disk, a magneto-optical disk, a semiconductor memory, or the like is appropriately mounted in the drive 20. A program read from the removable medium 30 by the drive 20 is installed in the storage unit 18 as necessary. The removable medium 30 can store various data stored in the storage unit 18 in the same manner as the storage unit 18.

Although not shown, in the information processing system in FIG. 2, the dedicated communication device 2, the user terminal 3, the speech server (PBX) 4, and the call destination terminal 5 each also have the hardware configuration shown in FIG. 3. In this regard, however, when the dedicated communication device 2, the user terminal 3, and the call destination terminal 5 each are composed of a smartphone or a tablet, touch panels are provided as the output unit 16 and the input unit 17.

This collaboration between various hardware and software of the management server 1 in FIG. 1 enables the management server 1 to perform various processes such as sales support processing. As a result, a service provider (not shown) can provide the above-described service to the user U. The sales support processing refers to a process of generating and presenting sales support information to the user U. Hereinafter, functional components for executing the sales support processing will be described.

(Functional Components)
(Management Server)

Figure 4:
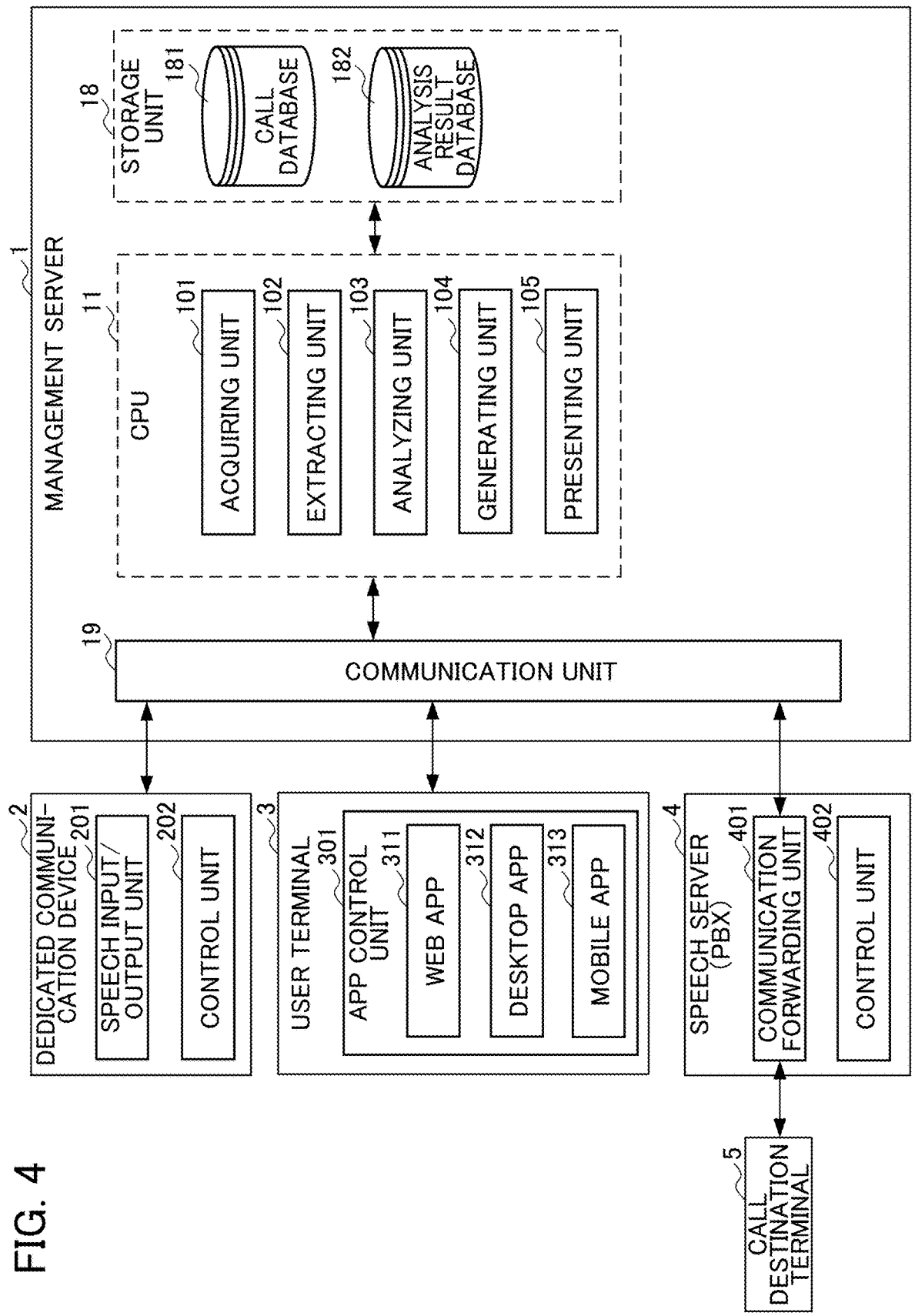
FIG. 4 is a functional block diagram showing functional components for executing sales support processing among the functional components of the information processing system including the management server in FIG. 3.

FIG. 4 is a functional block diagram showing functional components for executing sales support processing among the functional components of the information processing system including the management server 1 in FIG. 3.

As shown in FIG. 4, in the CPU 11 in the management server 1, when the execution of sales support processing is controlled, an acquiring unit 101, an extracting unit 102, an analyzing unit 103, a generating unit 104, and a presenting unit 105 function.

The acquiring unit 101 acquires information recorded in a call between a user and a call destination as call information. Specifically, the acquiring unit 101 acquires information recorded in a call between the user U and the call destination C as call information. The call information acquired by the acquiring unit 101 is stored and managed in a call database 181.

The extracting unit 102 detects speaking sections in which speech exists from the acquired call information, and extracts speech information for each speaking section. Specifically, the extracting unit 102 detects the speaking sections VS1 to VSn from the call information acquired by the acquiring unit 101, and extracts the speech information VI1 to VIm from the speaking sections VS1 to VSv, respectively.

The analyzing unit 103 performs analysis based on one or more elements, based on the extracted one or more pieces of the speech information. Specifically, the analyzing unit 103 performs analysis based on the elements E1 to Ep, based on the speech information VI1 to VIm extracted by the extracting unit 102. As described above, the analyzing unit 103 can perform analysis using information on "on-hold tone", "locations where only the user U is speaking", "locations where only the call destination C is speaking", "locations where overlapping occurs", "locations where silence occurs", and the like as elements E. For example, when performing analysis using information on "on-hold tone" as an element E, the speech of the user U and the speech of the call destination C included in speech information VI are distinguished from on-hold tones, and the count and duration of locations where a call is put on hold are identified. Further, for example, the analyzing unit 103 can determine the degree of emotion of the user U and the call destination C based on the elements E1 to Ep, and can add the determination result to the analysis result. In this case, by including a video relay server (not shown) in addition to the speech server (PBX) 4 in the configuration of the information processing system, it is also possible to determine the degree of emotion of the user U and the call destination C from a captured moving image. Further, for example, the analyzing unit 103 may improve the accuracy of analysis by considering search results including fluctuation in analysis candidates in the analysis. The results of analysis by the analyzing unit 103 are stored and managed in an analysis result database 182.

The generating unit 104 generates support information that supports calls of the user based on the results of analysis. Specifically, the generating unit 104 generates sales support information based on the results of the analysis by the analyzing unit 103. The details of the sales support information generated by the generating unit 104 will be described later with reference to a specific example shown in FIG. 5.

The presenting unit 105 presents the generated support information to the user. Specifically, the presenting unit 105 controls transmitting the sales support information generated by the generating unit 104 to the user terminal 3.

(Dedicated Communication Device)

When the management server 1 controls execution of the sales support processing, a speech input/output unit 201 and a control unit 202 function in the dedicated communication device 2.

The speech input/output unit 201 inputs and outputs speech.

The control unit 202 controls various functions of the dedicated communication device 2. Specifically, for example, the control unit 202 controls input/output of speech and communication in the dedicated communication device 2.

(User Terminal)

When the management server 1 controls the execution of the sales support processing, an app control unit 301 functions in the user terminal 3.

The app control unit 301 controls the installation, activation, and termination of various apps in the user terminal 3. Specifically, for example, the app control unit 301 controls the installation, activation, and termination of a web app 311, a desktop app 312, and a mobile app 313. In this regard, the web app 311 is an app used through the network N. The desktop app 312 is an app that operates on the desktop environment of the user terminal 3, and operates by being installed in the user terminal 3. The mobile app 313 is an app designed to operate on smartphones, tablets, or other mobile terminals.

(Speech Server (PBX))

When the management server 1 controls the execution of the sales support processing, a communication forwarding unit 401 and a control unit 402 function in the speech server (PBX) 4.

The communication forwarding unit 401 forwards communication information transmitted from the dedicated communication device 2 to the call destination terminal 5, and forwards communication information transmitted from the call destination terminal 5 to the dedicated communication device 2. The control unit 402 controls the forwarding of communication information by the communication forwarding unit 401.

The information processing system that includes the management server 1, the dedicated communication device 2, the user terminal 3, and the speech server (PBX) 4 with the above-described functional components can perform a posting determination process. As a result, in the course of business, when training the user who is managed, the manager can train the user inexpensively and efficiently by utilizing the sales support information. In addition, the user can utilize the support information in real time in a call with the call destination. As a result, it is possible to improve the contract rate while reducing the cost of training the user (salesperson).

Specific Example

A specific example of the sales support information generated by the management server 1 will be described with reference to FIGS. 5 to 7. FIG. 5 shows a specific example of sales support information generated by the management server 1.

The sales support information shown in FIG. 5 is displayed on the user terminal 3 so as to be visible to the user U who performs telephone sales. As shown in FIG. 5, the sales support information is composed of display areas F1 and F2.

The display area F1 can display a search button for performing normal search or fuzzy search (fluctuation) and the history of the most recent call with the call destination C by each of users U1 to Ur (r is an integer value of 1 or more). This makes it possible to search from various angles, and easily confirm which user has talked to which call destination C, when (year/month/day/hour/minute/second), what, and how.

In the example shown in FIG. 5, it is understood that the user U2 conducts telephone sales to a person in charge "00" of "00 Corporation" at "10:04" on "Oct. 25, 2018", and the duration of the call is "1:56 (1 minute 56 seconds)". It is understood that the user U3 conducts telephone sales to a person in charge "00" of "00 Co., Ltd." at "09:03" on "Oct. 25, 2018", and the duration of the call is "2:12 (2 minutes and 12 seconds)". It is understood that the user U4 conducts telephone sales to a person in charge "00" of "00 Clinic" at "08:57" on "Oct. 25, 2018", and the duration of the call is "2:02 (2 minutes and 2 seconds)". Other examples of the history of the most recent call with the call destination C by each of users U1 to Ur are as shown in the display area F1 of FIG. 5.

The display area F2 displays registered telephoning memo items, a button B51 displayed as "add telephoning memo" (hereinafter referred to as "telephoning memo addition button B51"), the results of analyzing call information based on a plurality of elements E (hereinafter referred to as "call analysis results"), and comments including information related to the call information.

Here, "telephoning memo" refers to a brief memo created using pre-registered items after the end of a call. The telephoning memo can be registered in association with the call information. As a result, it is easy to manage call information, so that it is possible to easily perform after-the-fact check. The function of registering a telephoning memo is hereinafter referred to as a "telephoning memo function".

The telephoning memo function is not a function to register the content of a memo inputted as free words, but rather a function to register preset standardized sentences in addition to the content of a memo inputted as free words. Therefore, since the user U can immediately register one or more telephoning memos after the end of a call, the time cost required for registering the telephoning memos can be minimized. As a result, it is possible to avoid the occurrence of a situation such as "I couldn't leave a memo because I didn't have time". For example, if the content of a call is that "an appointment was successfully acquired", the user U selects and registers an item such as "appointment successfully acquired" from preset telephoning memo items.

The telephoning memo function may be intended for managers. In other words, only managers may perform the setting and registration of telephoning memos. In this case, it can be utilized as a reliable telephoning memo reviewed by a manager. Alternatively, the telephoning memo function may be a function that can be used by people other than a manager. That is, even people other than a manager can register telephoning memos. In this case, a person in charge can register a telephoning memo as a memo created at the end of a call where the memory of the content of the call is clearest.

In the example of FIG. 5, as registered telephoning memo items, an icon indicating "appointment successfully acquired" and an icon indicating "other company's service X being used" are displayed. In this case, a telephoning memo "appointment successfully acquired" and a telephoning memo "other company's service X being used" are registered in the call information.

The telephoning memo addition button B51 is a button that is pressed when an additional telephoning memo is registered in the call information. When the telephoning memo addition button B51 is pressed, an operation screen for selecting and registering a telephoning memo (hereinafter referred to as "telephoning memo selection registration screen") is displayed. A registered telephoning memo can be deleted (unregistered) by performing a predetermined operation. A specific example of the telephoning memo selection registration screen will be described later with reference to FIG. 6.

In the "call analysis results", a graph in which call information is visible (hereinafter referred to as "speech graph"), assessment of telephoning, assessment of speech, speaking speed, the time and the number of times a given keyword appeared during a call, and comments from another user U and AI (artificial intelligence).

In the speech graph, the call information between the user U1 and the call destination C (person in charge OO of OO sports) is visualized between 15:25 on Oct. 25, 2018 and 15:27 on Oct. 25, 2018.

The speech graph is a graph in which the horizontal axis represents call time, the vertical axis (upper) represents the output amount of the speech of the user U1, and the vertical axis (lower) represents the output amount of the speech of the call destination C. A solid line L1 represents the speech of the user U1, and a dotted line L2 represents the speech of the call destination C. From the solid line L1 and the dotted line L2, it is understood that basically, while the user U1 speaks, the call destination C does not speak (listening silently), and while the call destination C speaks, the user U1 does not speak (listening silently). Here, the location indicated by Z3 is a state in which both simultaneously speak (overlapping), and the user U1 might begin to speak before the call destination C had finished speaking. The locations indicated by Z1 and Z2 are periods during which both parties are not speaking (periods of silence). The locations indicated by P1 and P2 are locations where a given keyword appeared.

In the speech graph, as shown in FIG. 5, various buttons displayed as "playback", "stop", "comments", "playback speed", and "download" are arranged. Since various buttons displayed as "playback", "stop", and "playback speed" are arranged, the playback and stop of the call, and the change of playback speed can be freely performed. In addition, the button displayed as "comments" is arranged so that the user can view comments related to the call and write his/her own. Further, since the button displayed as "download" is arranged, the call information can be freely downloaded and saved. Further, although not shown, it is also possible to jump to "bookmark" and play back it.

The assessment of telephoning (the "telephoning assessment" in FIG. 5) is indicated by "total score", "Talk:Listen ratio", "silence count", "overlapping count", and "keyword count". In the example shown in FIG. 5, it is understood that the total score is "4.7", the Talk:Listen ratio is "63(%):37 (%)", the silence count is "2 (Z1 and Z2 in the speech graph)", the overlapping count is "1 (Z3 in the speech graph)", and the keyword count is "2 (P1 and P2 in the speech graph)". As a result, the user U1 can check, for example, whether he/she talked too much or whether the explanation was insufficient, from the numerical values displayed in the "Talk:Listen ratio". In addition, from the numerical value displayed in the "silence count", the user U1 can infer, for example, that his/her conversation skill was inexperienced, the possibility that he/she has made the call destination C feel uneasy or uncomfortable, etc. From the numerical value displayed in the "overlapping count", the user U1 can check, for example, the possibility that he/she has made the call destination C feel uncomfortable by interrupting the call destination C before the call destination C has finished speaking. From the "keyword count", the user U1 can check, for example, whether the name of a new product, a merit or risk for the call destination C, etc. have been properly communicated to the call destination C.

The assessment of speech ("speech assessment" in FIG. 5) is indicated by "basic frequency (user)", "basic frequency (call destination)", "inflection strength (user)", and "inflection strength (call destination)". In the example shown in FIG. 5, it is understood that the basic frequency (user) is "246.35 Hz", the basic frequency (call destination) is "86.94 Hz", the inflection strength (user) is "0.3", and the inflection strength (call destination) is "0.1". As a result, the user U1 can check, for example, whether he/she talked calmly, whether he/she did not unnecessarily excite the call destination C, and whether he/she took care to calm the excited call destination C, by comparing the numerical values of the "basic frequency" and the "inflection strength" of the user U1 with those of the call destination C.

The "speaking speed" is indicated by the number of letters (or the number of words) uttered within one second for each of the user U1 and the call destination C. In the example shown in FIG. 5, it is understood that the speaking speed of the user U1 was "10.30 letters/second" and the speaking speed of the call destination C was "6.08 letters/second". That is, it is understood that the user U1 spoke at a much higher speed. As a result, the user U1 can check whether he/she spoke too fast and too much and whether he/she made the call destination C speak calmly.

The "keyword appearance" is indicated by the time and the number of times a given keyword appeared for each of the user U1 and the call destination C. At this time, even if the result of speech recognition is incorrect because the speech is unclear, or the output is incorrect because it is a word that is not commonly used, such as an internal company term, a keyword can be detected by recognizing a phoneme sequence similar to a given keyword. The algorithm used for recognition of similar phoneme sequences is not limited. Specifically, for example, matching can be performed by a method using a Levenshtein distance (modified distance). In the example shown in FIG. 5, it is understood that the time at which the keyword appeared is the time (P1) at which "1:23 (1 minute 23 seconds)" has elapsed after the start of the call and the time (P2) at which "1:36 (1 minute 36 seconds)" has elapsed after the start of the call. As a result, the user U1 can check, for example, whether he/she has properly conveyed the name of a new product as a keyword, or whether he/she has been able to impress the name of the new product by making the call destination C speak the name of the new product.

As described above, in the "comments", comments including information related to the call information between the user U1 and the call destination C are displayed. Specifically, a comment from another user U and a comment from AI (artificial intelligence) are displayed. This makes it possible not only to share information and know-how among the users U, but also to easily acquire accurate sales support information based on analysis results. In the example shown in FIG. 5, at 22:58 (hour:min) on Oct. 27, 2018, a comment stating "With an internal transfer, the person in charge seems to have replaced OO from OO in the 1:00 location" has been posted. This comment was presented to the user U1 as sales support information because it was found from the analysis result of the speech information that the call destination C was replaced when exactly one minute has elapsed from the start of the call, and that the reason therefor is an internal transfer. At 23:00 (hour:min) on Oct. 27, 2018, a comment stating "According to 2:35-3:00, they are currently using other company's service, but are dissatisfied with the service, and thus they are considering introducing our service. According to 5:00, the maximum number of users is expected to be 1300" has been posted. This comment was presented to the user U1 as sales support information because it was found from the analysis result of the speech information that the call destination C was considering changing the currently used other company's service to the service of the user U1's company because they are dissatisfied with the currently used service, and that the maximum number of users is expected to be 1300. In this manner, the user U1 can easily check the sales support information shown in FIG. 5 by operating the user terminal 3. Therefore, the user U1 can perform self-coaching by utilizing the support information in real time or after the fact in a call with the call destination C. In addition, in the course of business, when training the user U1, the manager can train the user U1 inexpensively and efficiently by utilizing the sales support information. Thus, it is possible to improve the contract rate while reducing the cost of training the user U1 (salesperson).

FIG. 6 shows a specific example of the telephoning memo selection registration screen.

When a call is completed, or when the telephoning memo addition button B51 in FIG. 5 is pressed, for example, the "telephoning memo selection registration screen" as shown in FIG. 6 is displayed. The user U can select a corresponding item from one or more items displayed on the telephoning memo selection registration screen and register it in the call information.

The telephoning memo selection registration screen is composed of display areas F3 and F4. In the display area F3, each of preset items is displayed together with a check box T31. In the example of FIG. 6, the following items are displayed: appointment successfully acquired, absence of the person in charge, callback, resignation of the person in charge, continuous follow-up, no needs, other company's service X being used, and other company's service Y being used.

Among the items exemplified in FIG. 6, the "appointment successfully acquired" is an item that can be registered as a telephoning memo when an appointment of the call destination C is acquired, as described above. The "absence of the person in charge" is an item that can be registered as a telephoning memo when the person in charge of the call destination C is absent. The "callback" is an item that can be registered as a telephoning memo when the call destination C wants to call back because of the absence of the person in charge or the like. The "resignation of the person in charge" is an item that can be registered as a telephoning memo when the person in charge of the call destination C has resigned. The "continuous follow-up" is an item that can be registered as a telephoning memo when it is determined that continuous follow-up with the call destination C is necessary. The "no needs" is an item that can be registered as a telephoning memo when it is determined that there are no needs for the call destination C. The "other company's service X is being used" is an item that can be registered as a telephoning memo when it is found that the call destination C uses the service X that has already been provided by a competitor. The "other company's service Y being used" is an item that can be registered as a telephoning memo when it is found that the call destination C uses the service Y that has already been provided by a competitor.

The user U can register an item as a telephoning memo in the call information only by performing an operation of selecting a check box T31 (check) displayed together with each item. As described above, the item registered as a telephoning memo is displayed as an icon in the display area F2 of the call information shown in FIG. 5. In the example shown in FIG. 6, the check boxes of "appointment successfully acquired" and "other company's service X being used" are selected (checked). Therefore, as shown in FIG. 5, icons displayed as "appointment successfully acquired" and "other company's service X being used" are displayed in a predetermined area (the display area F2 in the example of FIG. 5) of the call information.

In the display area F4, a button B41 displayed as "+ add item" and a button B42 displayed as "register" are displayed. When the button B41 displayed as "+ add item" is pressed, an operation screen (hereinafter referred to as "telephoning memo setting screen") on which the setting of adding a new item can be performed, in addition to the items displayed in the display area F3, is displayed. When a new item is set in advance on the telephoning memo setting screen, the setting content is reflected on the telephoning memo selection registration screen. A specific example of the telephoning memo setting screen will be described later with reference to FIG. 7.

FIG. 7 shows a specific example of the telephoning memo setting screen.

The telephoning memo setting screen is composed of display areas F5 and F6. In the display area F5, the guidance message "If the telephoning memo function is set, a telephoning memo can be registered after the call is over" and a check box T51 to enable/disable the telephoning memo are displayed. The user U can specify whether to display a telephoning memo in the call information by pressing the check box T51. Specifically, if the check box T51 is selected (checked), the user U has decided to "display" a telephoning memo in the call information. On the other hand, when the check box T51 is not selected (checked), the user U has decided not to display a telephoning memo in the call information. In the example of FIG. 7, since the check box T51 is selected (checked), the user U decides to "display" a telephoning memo in the call information.

In the display area F6, an input field R1 for inputting the content of each item to be set, and check boxes T61 for setting whether to select (check) it as positive telephoning are displayed. Here, an item not set in the list of telephoning memos can be additionally set by inputting free words in the input field R1. Further, when the check box T61 is selected (checked), the item will be recorded as exemplary telephoning. An item recorded as exemplary telephoning can be utilized in various analyses. In the example shown in FIG. 7, the check box T61 indicating appointment successfully acquired is selected (checked) from among the set items of appointment successfully acquired, absence of the person in charge, callback, resignation of the person in charge, continuous follow-up, no needs, other company's service X being used, and other company's service Y being used. Therefore, the telephoning memo "appointment successfully acquired" is recorded as exemplary telephoning, and can be utilized in various analyses.

[Second Invention]
(Communication Hardware)

The communication hardware (e.g., the dedicated communication device 2 in FIG. 2) used by the user U to use this service can be substituted by existing communication hardware (e.g., a personal computer, a smartphone, a tablet). Here, since the user terminal 3 is composed of a personal computer, a smartphone, a tablet, or the like, the user terminal 3 can encompass the functions of the dedicated communication device 2. That is, since this service can be utilized using existing communication hardware, the user U can enjoy the following merits, for example. That is, according to the communication hardware used in this service, by substituting an existing smartphone or the like, this service can be used only after a setting work of several minutes. This eliminates construction costs, maintenance costs, leasing costs, costs required for various equipment, and the like. In addition, all calls can be recorded and analyzed, and the call history can be checked.

In addition, according to the communication hardware used in this service, since an excellent carrier in Japan can be used, an inexpensive communication fee and a simple fee system can be utilized. This can greatly reduce communication costs, particularly in a sales department where there are many opportunities to make calls. A telephone number starting with "(Tokyo) 03", "050", "0120", "0800", or the like can be freely acquired. In addition, it is possible to realize high-quality and stable calls. In addition, a single telephone number can be used to make calls in Japan and overseas. Further, even when an existing smartphone is used, for example, it is possible to make and receive calls using a telephone number starting with "(Tokyo) 03". It is suitable for sales departments who often go out because it can be used from outside as well as in-house.

Moreover, by sharing the same telephone number among a plurality of users U, telephoning by a team is possible. Since this service uses a cloud (the management server 1 in FIG. 2), addition or deletion of members can be easily performed. This makes it possible to flexibly cope with organizational changes and internal transfers. In addition, it is possible to easily set an interactive voice response (IVR) and automatic call forwarding.

The communication path when this service is provided is not limited. For example, in addition to a communication path that connects to a cloud on the Internet via an internal LAN (local area network), a communication path that connects to a cloud via a data communication network provided by a telecommunications company can be employed. This makes it possible to avoid network congestion, and to cooperate with a Web app connected through a separate path via the management server 1. It is also possible to determine network congestion and automatically switch the network path used in this service. The specific configuration of the communication hardware used in this service is not limited. Any device may be used as long as it is equipped with a subscriber identity module (SIM), which is a module for recognizing subscribers, and equipment (modem, antenna, etc.) necessary for communication. For this reason, an existing communication device such as a smartphone may be used, or dedicated hardware may be used. If dedicated hardware is used, the headset used by the user U may be equipped with dedicated hardware including power supply means (e.g., a lithium ion battery).
(Processing Flow)

Figure 8:
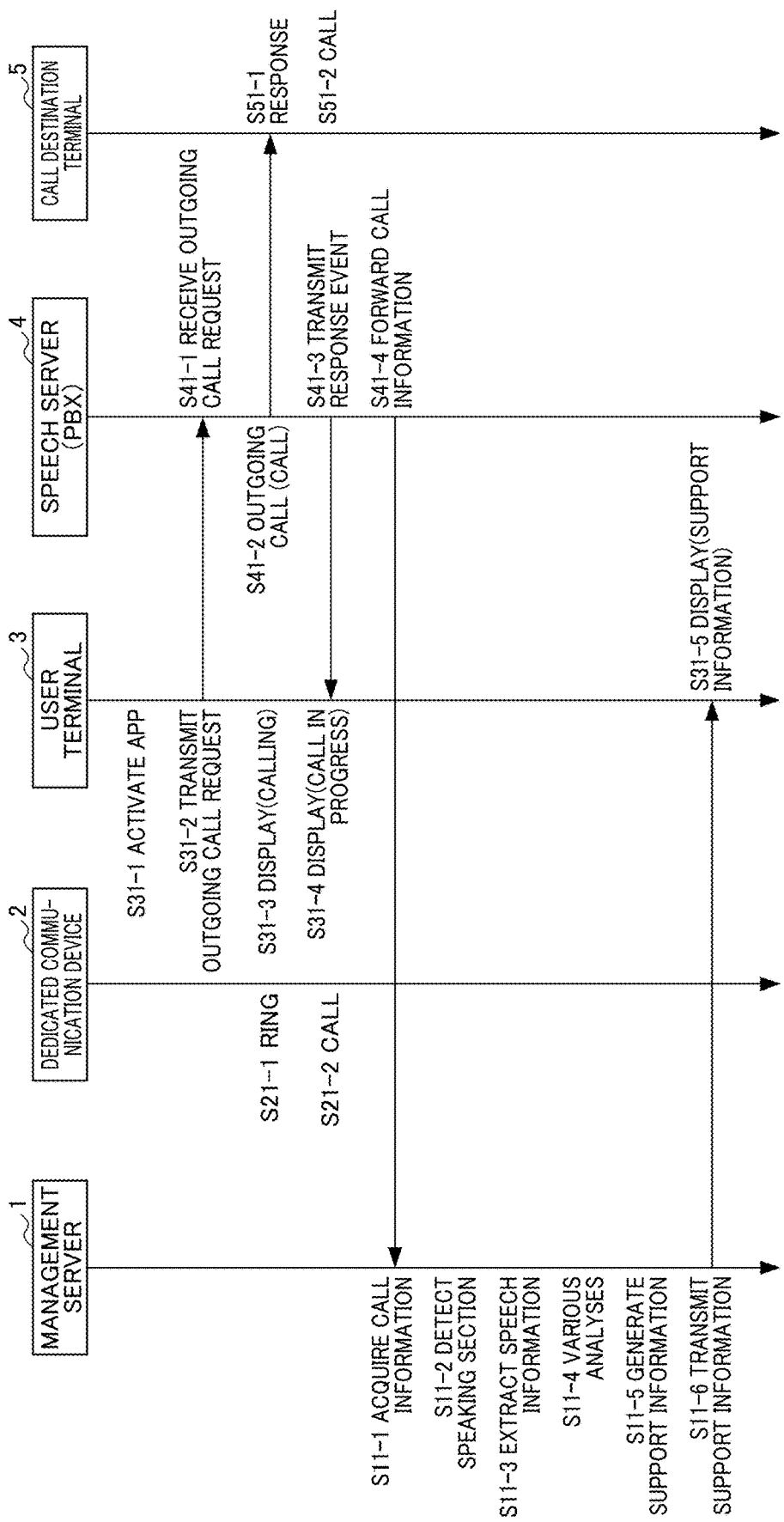
FIG. 8 shows a flow of processing of the information processing system when the user calls a call destination.
Figure 9:
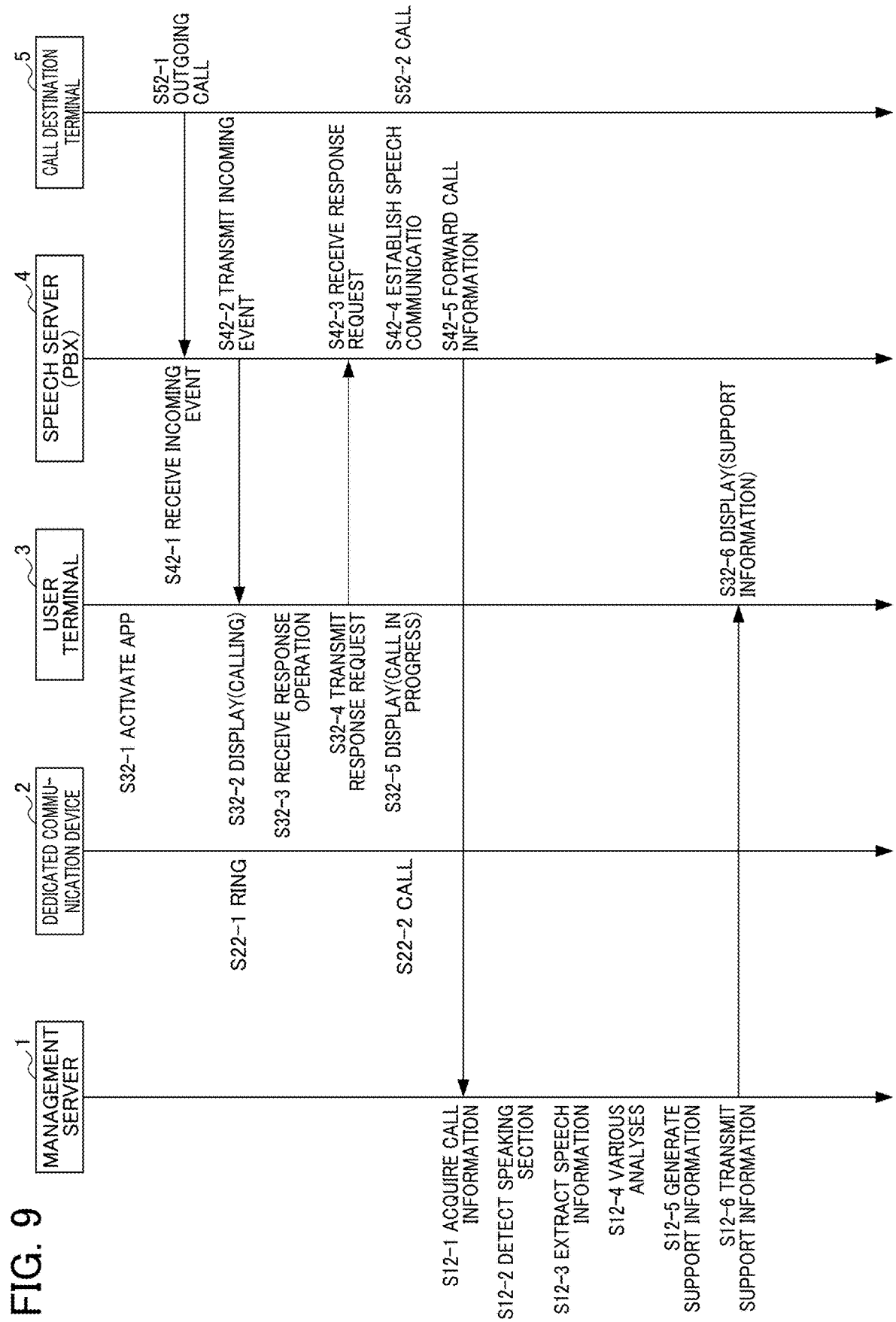
FIG. 9 shows a flow of processing of the information processing system when the user receives a call from a call destination.

With reference to FIGS. 8 and 9, the flow of processing of an information processing system including the communication hardware (e.g., the dedicated communication device 2 in FIG. 2) according to the second invention, will be described. FIGS. 8 and 9 are diagrams showing a flow of processing of the information processing system including the dedicated communication device 2. FIG. 8 shows a flow of processing of the information processing system when the user U calls the call destination C.

When the user U calls the call destination C, the following processing is executed in the information processing system. That is, in step S31-1, the user terminal 3 activates various apps. Specifically, the user terminal 3 activates the web app 311, the desktop app 312, and the mobile app 313.

In step S31-2, the user terminal 3 transmits an outgoing call request to the speech server (PBX) 4. Specifically, the "outgoing call" button or a telephone number displayed on the screen of the user terminal 3 is pressed. More specifically, an app installed in the user terminal 3 transmits an outgoing call request. In step S41-1, the speech server (PBX) 4 receives the outgoing call request from the user terminal 3.

In step S41-2, the speech server (PBX) 4 makes an outgoing call (call) to the call destination terminal 5. Along with this, in step S21-1, the dedicated communication device 2 makes a ringing indicating that an outgoing call (call) is being made by the voice server (PBX) 4. Then, in step S31-3, the user terminal 3 displays information indicating that the outgoing call (call) is being made by the speech server (PBX) 4. Here, the information displayed on the user terminal 3 is not limited. For example, the text "calling" may be displayed on the user terminal 3. In step S51-1, the call destination terminal 5 responds to the outgoing call (call) of the speech server (PBX) 4.

In step S51-2, the call destination terminal 5 is ready to allow communication. Accordingly, in step S41-3, the speech server (PBX) 4 transmits information (hereinafter referred to as "response event") indicating that a response is made by the call destination terminal 5 to the user terminal 3. Then, in step S21-2, the dedicated communication device 2 is ready to allow communication. This allows the user U and the call destination C to talk. When the dedicated communication device 2 is ready to allow communication, in step S31-4, the user terminal 3 receives the response event and displays information indicating that a call is in progress. Here, the information displayed on the user terminal 3 is not limited. For example, the text "responding" may be displayed on the user terminal 3.

In step S41-4, the speech server (PBX) 4 forwards call information to the management server 1. In step S11-1, the management server 1 acquires the transmitted call information.

In step S11-2, the management server 1 detects speaking sections VS1 to VSn from the acquired call information. In step S11-3, the management server 1 extracts speech information VI1 to VIm from the detected speaking sections VS1 to VSv, respectively. In step S11-4, the management server 1 performs analysis based on elements E1 to Ep based on the extracted speech information VI1 to VIm. As described above, the analyzing unit 103 can perform analysis using information on "on-hold tone", "locations where only the user U is speaking", "locations where only the call destination C is speaking", "locations where overlapping occurs", "locations where silence occurs", and the like as elements E. In step S11-5, the management server 1 generates sales support information based on the results of the analysis.

In step S11-6, the management server 1 transmits the generated sales support information to the user terminal 3. In step S31-5, the user terminal 3 displays the sales support information transmitted from the management server 1.

Thus, the processing of the information processing system when the user U calls the call destination C is completed. By executing each of the above processes in the information processing system, it is possible to improve the contract rate while reducing the cost of training the user (salesperson).

FIG. 9 shows a flow of processing of the information processing system when the user U receives a call from the call destination C.

When the user U receives a call from the call destination C, the following processing is executed in the information processing system. That is, in step S32-1, the user terminal 3 activates various apps. Specifically, the user terminal 3 activates the web app 311, the desktop app 312, and the mobile app 313.

In step S52-1, the call destination terminal 5 makes an outgoing call to the speech server (PBX) 4. In step S42-1, the speech server (PBX) 4 receives the outgoing call from the call destination terminal 5 as an incoming event.

In step S42-2, the speech server (PBX) 4 transmits the incoming event to the user terminal 3. Specifically, the speech server (PBX) 4 transmits an incoming event to an app installed in the user terminal 3. Accordingly, in step S22-1, the dedicated communication device 2 makes a ringing indicating that the incoming event is being transmitted by the speech server (PBX) 4. Then, in step S32-2, the user terminal 3 displays information indicating that the incoming event is being transmitted by the speech server (PBX) 4. Here, the information displayed on the user terminal 3 is not limited. For example, the text "receiving" may be displayed on the user terminal 3.

In step S32-3, the user terminal 3 receives a response operation by the user U. The response operation is, for example, an operation in which the user U presses a button displayed as "answer the telephone" on the screen of the user terminal 3. In step S32-4, the user terminal 3 transmits a response request to the speech server (PBX) 4. In step S42-3, the speech server (PBX) 4 receives the transmitted response request. In step S42-4, the speech server (PBX) 4 establishes speech communication. As a result, in step S22-2, the dedicated communication device 2 is ready to allow communication. In step S52-2, the call destination terminal 5 is ready to allow communication. Then, in step S32-5, the user terminal 3 displays information indicating that a call is in progress. Here, the information displayed on the user terminal 3 is not limited. For example, the text "talking" may be displayed on the user terminal 3.

In step S42-5, the speech server (PBX) 4 forwards call information to the management server 1. In step S12-1, the management server 1 acquires the transmitted call information.

In step S12-2, the management server 1 detects speaking sections VS1 to VSn from the acquired call information. In step S12-3, the management server 1 extracts speech information VI1 to VIm from the detected speaking sections VS1 to VSv, respectively. In step S12-4, the management server 1 performs analysis based on elements E1 to Ep based on the extracted speech information VI1 to VIm. As described above, the analyzing unit 103 can perform analysis using information on "on-hold tone", "locations where only the user U is speaking", "locations where only the call destination C is speaking", "locations where overlapping occurs", "locations where silence occurs", and the like as elements E. In step S12-5, the management server 1 generates sales support information based on the results of the analysis.

In step S12-6, the management server 1 transmits the generated sales support information to the user terminal 3. In step S32-6, the user terminal 3 displays the sales support information transmitted from the management server 1. Thus, the processing of the information processing system when the user U receives a call from the call destination C is completed. By executing each of the above processes in the information processing system, it is possible to improve the contract rate while reducing the cost of training the user (salesperson).

Specific Examples

Figure 10:
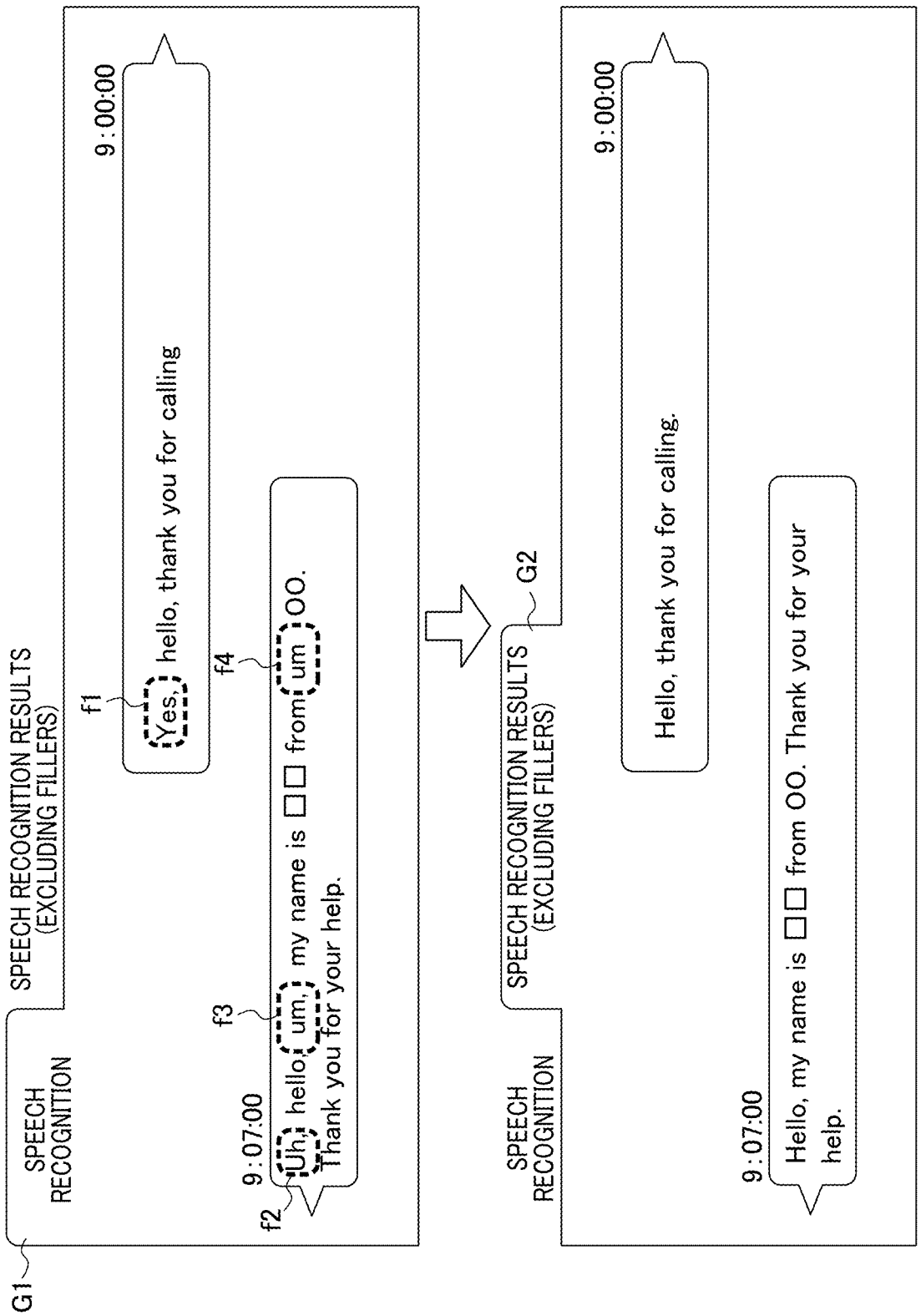
FIG. 10 shows a specific example in which fillers in sentences in speech recognition results are identified and removed.

FIG. 10 shows a specific example in which fillers in sentences in speech recognition results are identified and removed.

The speech recognition results are transcribed into text, and so-called fillers f indicating stuttering are removed. Specifically, for example, as shown in the upper part of FIG. 10, if the speech recognition result is "Yes, hello, thank you for calling", then "Yes" is identified as a filler f1. If the speech recognition results are "Uh, hello, um, my name is □□ from um OO. Thank you for your help", the "Uh" and the two "um" are respectively identified as fillers f2 to f4. The letters respectively identified as fillers f1 to f4 are deleted. As a result, as shown in the lower part of FIG. 10, the sentence "Hello, thank you for calling" is displayed from which the filler f1 has been deleted. In addition, the sentences "Hello, my name is □□ from OO. Thank you for your help" are displayed from which the fillers f2 to f4 have been deleted. As shown in the upper part of FIG. 10, when a tab G1 displayed as "speech recognition" is selected, the speech recognition results from which the fillers f have not been deleted are displayed. On the other hand, as shown in the lower part of FIG. 10, when a tab G2 displayed as "speech recognition results (excluding fillers)" is selected, the results with the fillers f deleted are displayed.

While an embodiment of the present invention has been described above, the present invention is not limited to the above-described embodiment, and modifications, improvements, and the like within the scope of achieving the object of the present invention are included in the present invention.

Further, for example, in the embodiment described above, the speech server 4 and the call destination terminal 5 are connected to each other via the telephone network T, but the present invention is not limited thereto. That is, the speech server 4 and the call destination terminal 5 may be connected to each other via any other communication means such as the Internet.

Further, for example, although FIG. 2 shows only one user U, one user terminal 3, one speech server (PBX) 4, one call destination C, and one call destination terminal 5, this is only an example, and there can be more than one of any of them.

Further, for example, in the above-described embodiment, this service can be used in the user terminal 3 by activating various apps installed in the user terminal 3, but the present invention is not limited thereto. This service may be made available by accessing a predetermined website and performing a predetermined login operation without installing apps.

Further, for example, in the above-described embodiment, as elements E for analyzing speech information, information on "on-hold tone", "locations where only the user U is speaking", "locations where only the call destination C is speaking", "locations where overlapping occurs", and "locations where silence occurs" is adopted, but these are merely examples, and analysis based on an element E other than these can be performed.

Further, for example, in the above-described embodiment, the call information includes only speech information, but in addition to the speech server (PBX) 4, a video relay server (not shown) may be included in the configuration of the information processing system. As a result, speech information and image information based on a captured moving image can be linked and managed as call information. In this case, by further providing the management server 1 with an image analysis function, analysis based on not only speech information but also image information can be performed.

Further, for example, in the above-described embodiment, the communication method between the user terminal 3 and the speech server (PBX) 4 is not limited. However, when using any port of TCP/UDP as the speech communication method, it may be regarded as an unauthorized communication, and blocked by a firewall or the like in an organization, causing the speech communication to fail. For this reason, the same communication method (443/TCP) as that of Web browsing may be adopted, for example. This enables the risk of being blocked by a firewall or the like in an organization to be reduced.

Further, for example, the history of calls made with the call destination C shown in the display area F1 in FIG. 5 may be arranged such that the most recent call is displayed at the top as in the present embodiment, or may be arranged in any other manner. For example, it may be arranged in order of the internal ID (not shown) of the users U1 to Ur, or it may be arranged in order of their sales performance from the top. By arranging it in order of sales performance from the top, many users U can easily see and use it as a reference for their own telephone sales.

Further, for example, the elements E shown as items in the column of "telephoning assessment" in the display area F2 in FIG. 5 are "total score", "Talk:Listen ratio", "silence count", "overlapping count", and "keyword count", but are not limited thereto. Analysis based on an element E other than these five elements E may be performed.

In addition, for example, the elements E shown as items in the column of "speech assessment" in the display area F2 in FIG. 5 are "basic frequency (user)", "basic frequency (call destination)", "inflection strength (user)", and "inflection strength (call destination)", but are not limited thereto. Analysis based on an element E other than these four elements E may be performed.

According to this service to which the present invention can be applied, the following functions can be implemented in addition to the functions described above. That is, telephoning time, fluctuation of telephoning time, speed, and the like are measured on a website or software, and it is possible to check whether the environment has sufficient quality for voice calls by one click. Alternatively, it is possible to use an engine that actually plays back speech for confirmation, compares it with normal speech in terms of interruption, fluctuation, sound quality, and the like, and performs analysis. This makes it possible to quantitatively quantify the readiness of the communication environment. The following functions to set the details of this service can be implemented: various setting functions for managing the user U, a function for setting automatic forwarding, a setting function for managing a plurality of users U as a group, a function for setting an answering machine, a function for setting telephone numbers, a function for setting rules for numeric values (scores) used for analysis, a function for setting prefix numbers such as non-notification setting of a telephone number, a function for setting a keyword in FIG. 5, a function for setting sounds such as on-hold tone, a function for setting a telephoning memo in FIG. 5, a function for setting rules for incoming calls, a function for linking with websites of other companies providing services related to CRM, a function for setting business hours, a function for setting an automatic voice response, and a setting function for linking with in-house services. Specifically, for example, according to the function for setting rules for numeric values (scores) used for analysis, it is possible to change the speaking speed depending on the industry to which the call destination C belongs. As an incoming/outgoing call function using the user terminal 3, it is possible to make an incoming/outgoing call using a widget or an app, or to easily make an outgoing call by clicking a telephone number displayed on a web page in a website. An incoming/outgoing call screen having a user interface (UI) that can be used in conjunction with various systems (e.g., an in-house system) may be provided.

Figure 11:
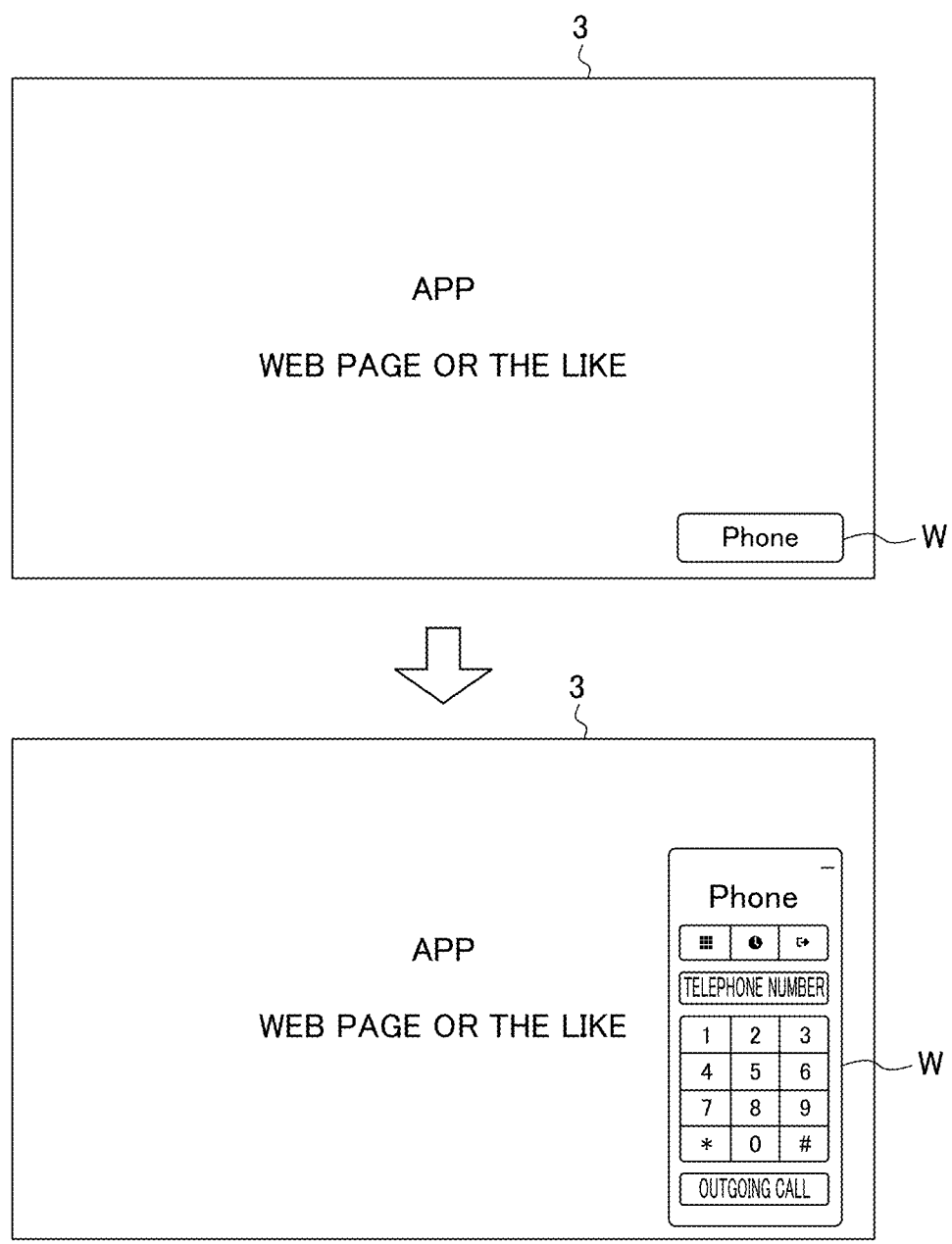
FIG. 11 shows an incoming/outgoing call screen with a UI that can be used in conjunction with various systems.

FIG. 11 shows a specific example of the incoming/outgoing call screen having a UI that can be used in conjunction with various systems. As shown in the upper part of FIG. 11, for example, a widget W labeled "Phone" can be displayed on an app screen or a part of a web page. When the widget W is pressed, the display of the widget W may be changed to a mode in which a telephone call can be made, as shown in the lower part of FIG. 11.

The hardware configuration of the management server 1 shown in FIG. 3 is merely an example for achieving the object of the present invention, and the present invention is not limited thereto.

The functional block diagram shown in FIG. 4 is merely an example, and the present invention is not limited thereto. That is, it suffices that the information processing system is provided with a function capable of executing the above-described series of processes as a whole, and what functional blocks are used for realizing this function is not limited to the example in FIG. 4.

The location of the functional blocks is not limited to FIG. 4, and any location may be possible. One functional block may consist of hardware alone, software alone, or a combination thereof.

When the processing of each function block is executed by software, a program constituting the software is installed on a computer or the like from a network or a recording medium. The computer may be embedded in dedicated hardware. The computer may be a computer capable of performing various functions by installing various programs, such as a general-purpose smartphone or a personal computer, in addition to a server.

The recording medium including such a program is not only composed of a removable medium that is separated from the device main body in order to provide the program to each user, but is also composed of a recording medium or the like that is provided to each user in a state of being incorporated in advance in the device main body.

In the present specification, the step of describing the program recorded on the recording medium includes not only processing performed in time series in accordance with the order, but also processing performed in parallel or individually, which is not necessarily performed in time series.

In the present specification, the term "system" means an overall device composed of a plurality of devices, a plurality of means, and the like.

In summary, it is sufficient that the information processing device to which the present invention is applied has the following configuration, and various embodiments may be employed. That is, the information processing device (for example, the management server 1 in FIG. 4) to which the present invention is applied supports a user (e.g., the user U in FIG. 2) who calls a call destination (e.g., the call destination C in FIG. 2). The information processing device includes: an acquiring unit (e.g., the acquiring unit 101 in FIG. 4) that acquires information recorded during a call between the user and the call destination as call information;
    an extracting unit (e.g., the extracting unit 102 in FIG. 4) that detects speaking sections (e.g., speaking sections VS1 to VSn) in which speech exists, from the acquired call information and extracts speech information (e.g., VI1 to VIm) for each speaking section;
    an analyzing unit (e.g., the analyzing unit 103 in FIG. 4) that performs analysis based on one or more elements (e.g., E1 to Ep) based on the extracted one or more pieces of the speech information;

a generating unit (e.g., the generating unit 104 in FIG. 4) that generates support information (e.g., sales support information) that supports the call of the user based on a result of the analysis; and a presenting unit (e.g., the presenting unit 105 in FIG. 4) that presents the generated support information to the user.

As a result, in the course of business, when training the user U who is managed, the manager can train the user U inexpensively and efficiently by utilizing the sales support information. In addition, the user U can utilize the support information in real time during the call with the call destination.

Figure 12:
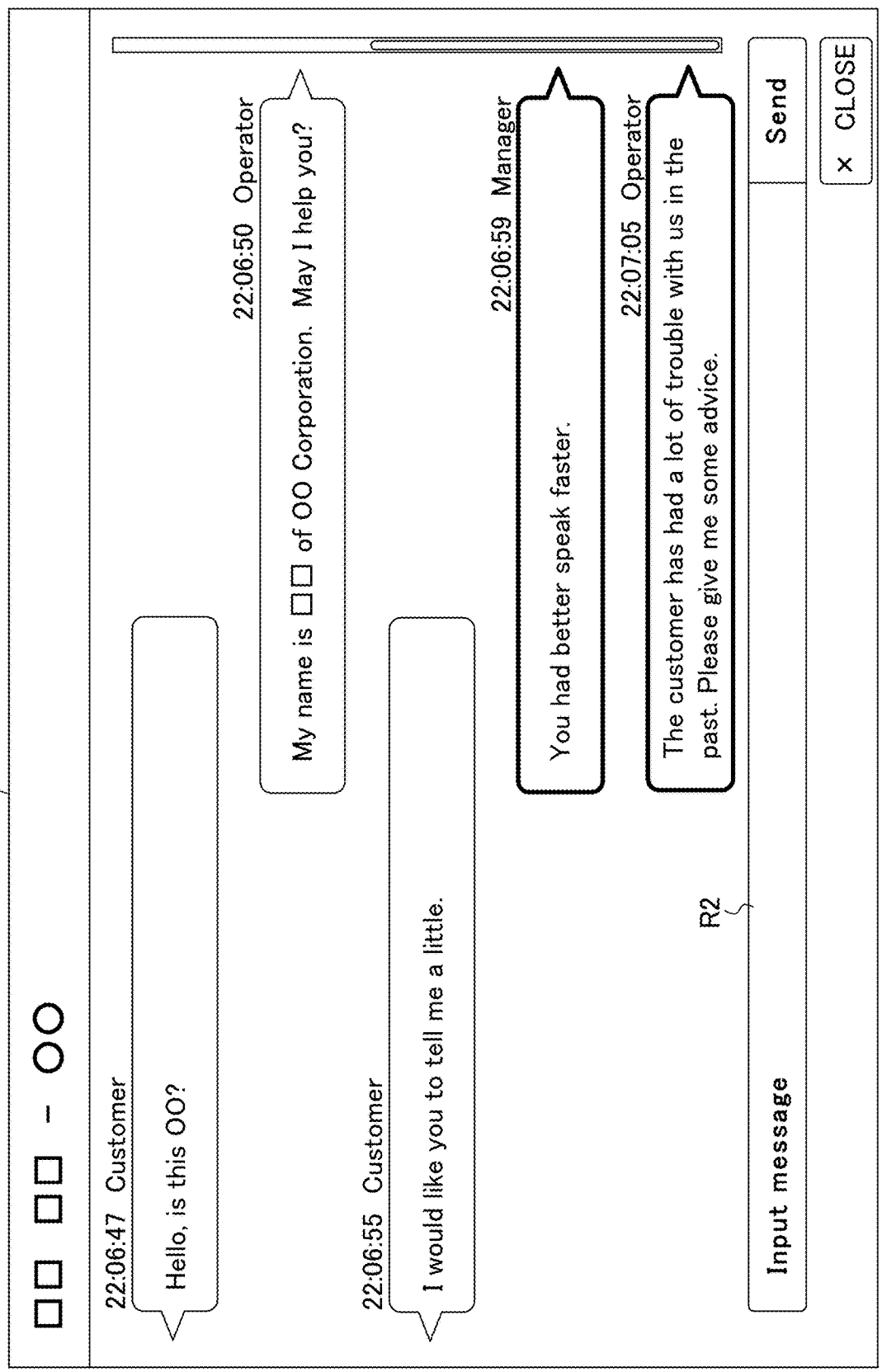
FIG. 12 shows a specific example of a case where the support information is utilized in real time.

FIG. 12 shows a specific example of a case where the support information is utilized in real time.

As shown in FIG. 12, the speaking of a customer and the user U (salesperson) can be sequentially displayed as text. This enables support information to be checked in real time. AI (artificial intelligence) and the superior of the user U (salesperson) can provide advice to the user U (salesperson) in real time. Specifically, for example, when advice such as "It is better to increase the speaking speed" is posted, the content is displayed in real time. Further, on the same screen as the screen on which the contents of the speaking of the customer and the user U (salesperson) are displayed, the user U (salesperson) can also post a message to their superior, for example. Specifically, for example, when a message such as "The customer has had a lot of trouble with us in the past. Please give me some advice" is input in an input field R2 and posted, the content is displayed in real time. As a result, it can assist in achieving more efficient sales activities while considering objective indicators.

The one or more elements may include information on on-hold tones.

This makes it possible to clarify the count and duration of locations where the call is put on hold, so that it is possible to check insufficient understanding of the user U and to infer the possibility that the user U has given stress to the call destination C.

The one or more elements may include information on a sound signal. Specifically, for example, the information on a sound signal may include locations where only the user is speaking, locations where only the call destination is speaking (e.g., "Talk:Listen ratio" in FIG. 5), locations where overlapping occurs (e.g., "overlapping count" in FIG. 5), locations where silence occurs (e.g., "silence count" in FIG. 5), frequency (e.g., the "basic frequency (user)", "basic frequency (call destination)" in FIG. 5), or inflection (e.g., "inflection strength (user)", and "inflection strength (call destination)" in FIG. 5).

As a result, the user U can check whether he/she talked too much and whether the explanation was insufficient. In addition, the user U can infer the immaturity of his/her conversation skill, the possibility of making the call destination C feel uneasy, or the possibility of making the call destination C feel uncomfortable. In addition, the user U can check the possibility of whether the user U may have caused the call destination C to feel uncomfortable due to interrupting the call destination C before the call destination C had finished speaking. Further, the user U can check whether the name of a new product, a merit or risk for the call destination C, and the like have been properly communicated to the call destination C.

As a result, the user U can check, for example, whether he/she talked calmly, whether he/she did not unnecessarily excite the call destination C, and whether he/she took care to calm the excited call destination C.

The one or more elements may further include information on letters in the speaking section (e.g., "speaking speed" in FIG. 5).

As a result, the user U can check whether he/she spoke too fast and too much and whether he/she made the call destination C speak calmly.

The support information may include at least one (e.g., "comments" in FIG. 5) of the following: a speaking style of the user, a content spoken by the call destination, or advice for the user.

Thus, the user U can utilize the support information in real time during the call with the call destination C. In addition, in the course of business, when training the user U who is managed, the manager can train the user U inexpensively and efficiently by utilizing the sales support information. As a result, it is possible to improve the contract rate while reducing the cost of training the user U.

When at least a part of a speech recognition result includes an error, the user can perform an operation of correcting it on the screen.

FIG. 13 shows a specific example of a correction function of a speech recognition result. As shown in FIG. 13, when the actual speech is "Uh, hello, I'm Nagata from Revcom Support", while the speech recognition result is "Uh, hello, I'm Shinagara from Business Support", for example, which includes some errors. In this case, the user performs input operations for correcting the speech recognition result to the actual speech content by pressing a playback button B102, a button B103 for copying to a clipboard, and an edit button B104. Thus, the errors of the speech recognition result can be corrected. The corrected speech recognition result is used as learning data to ensure that the next speech recognition is performed correctly. This can prevent the same misrecognition from being repeated. As a result, the accuracy of speech recognition can be improved.

EXPLANATION OF REFERENCE NUMERALS

1: management server, 2: dedicated communication device, 3: user terminal, 4: speech server (PBX), 5: call destination terminal, 11: CPU, 12: ROM, 13: RAM, 14: bus, 15: input/output interface, 16: output unit, 17: input unit, 18: storage unit, 19: communication unit, 20: drive, 30: removal media, 101: acquiring unit, 102: extracting unit, 103: analyzing unit, 104: generating unit, 105: presenting unit, 181: call database, 182: analysis result database, 201: speech input/output unit, 202: control unit, 301: app control unit, 311: web app, 312: desktop app, 313: mobile app, 401: communication forwarding unit, 402: control unit, N: network, T: telephone network, U, U1 to Ur: user, C: call destination, S: each step of processing executed in information processing system, F: each display area, L1: solid line (speech by the user), L2: dotted line (speech by the call destination), Z1, Z2: location where silence occurs, Z3: location where overlapping occurs, P1, P2: location where a keyword appears, T: each check box, B: each button, R: input field, G: tab, W: widget.

It is claimed:

1. An information processing device for supporting a user who calls a call destination that is a receiving party of a telephone operation, comprising:

an acquiring unit that acquires information recorded during a call between the user and the call destination as call information;

a generating unit that generates support information for the user in the call with the call destination based on the acquired call information;

a presenting unit that presents the generated support information to the user, and the presenting unit presenting as the support information regarding the call between the user and the call destination, and presenting a telephoning memo addition object allowing a telephoning memo created by selecting at least one pre-registered item of the plurality of pre-registered items to be registered in association with the call information.

2. The information processing device according to claim 1, wherein the telephoning memo addition object is a telephoning memo addition button.

3. The information processing device according to claim 1, wherein the presenting unit presents a comment including information related to the call information together with the support information.

4. The information processing device according to claim 1, wherein the presenting unit presents a search object that conducts a search concerning the call information acquired by the acquiring unit.

5. The information processing device according to claim 4, wherein the search object presented by the presenting unit includes a search button capable of conducting a normal search or a fuzzy search.

6. The information processing device according to claim 1, wherein the presenting unit presents as the support information at least one of pieces of information regarding the call between the user and the call destination, each of the pieces of information relating to at least one of a location where speaking occurs, a location where overlapping of speaking occurs, or a location where silence occurs; and presents a speaker chart showing speaker volume between the user the call destination during the call based on an output amount of each speaker, the speaker chart with a common vertical axis and a common horizontal axis showing the speaker volume for both the call destination.

7. An information processing device for supporting a user who calls a call destination that is a receiving party of a telephone operation, comprising:

an acquiring unit that acquires information recorded during a call between the user and the call destination as call information;

a generating unit that generates support information for the user in the call with the call destination based on the acquired call information;

a presenting unit that presents the generated support information to the user, and the presenting unit, upon the completion of the call, presents a telephoning memo registration screen that enables the registration of a telephoning memo associated with the call information, the memo being created using a telephoning memo addition object by selecting at least one pre-registered item of the plurality of pre-registered items.

8. The information processing device according to claim 7, wherein the presenting unit, based on a setting for displaying the telephoning memo specified for the call, presents a telephoning memo registration screen.

9. The information processing device according to claim 7, wherein the presenting unit presents the support information and is capable of presenting a telephoning memo registration screen via a telephoning memo addition button.

10. The information processing device according to claim 7, wherein the telephoning memo registration screen allows for setting whether to select the telephoning memo as a positive response.

11. The information processing device according to claim 7, wherein the presenting unit presents a comment including information related to the call information together with the support information.

12. The information processing device according to claim 7, wherein the presenting unit presents a search object that conducts a search concerning the call information acquired by the acquiring unit.

13. The information processing device according to claim 12, wherein the search object presented by the presenting unit includes a search button capable of conducting a normal search or a fuzzy search.

14. The information processing device according to claim 7, wherein the presenting unit presents an item addition object in the telephoning memo registration screen for adding a new telephoning memo.

15. The information processing device according to claim 7, wherein the presenting unit presents an evaluation of the response based on information regarding at least one of speaking, overlapping speaking, or silence that occurs during the call between the user and the call destination as the support information.

16. The information processing device according to claim 7, wherein the presenting unit, as an evaluation of the response, presents at least one of an overall score, a ratio of Talk to Listen, the number of silences, the number of overlaps, and the number of keyword occurrences.

17. The information processing device according to claim 7, wherein the presenting unit presents as the support information at least one of the fundamental frequency, intonation, or speech rate of the call.

18. The information processing device according to claim 7, wherein the presenting unit arranges and presents a button capable of playing back the call on the voice graph.

19. The information processing device according to claim 7, wherein the presenting unit:

presents as the support information at least one of pieces of information regarding the call between the user and the call destination, each of the pieces of information relating to at least one of a location where speaking occurs, a location where overlapping of speaking occurs, or a location where silence occurs; and presents a speaker chart showing speaker volume between the user the call destination during the call based on an output amount of each speaker, the speaker chart with a common vertical axis and a common horizontal axis showing the speaker volume for both the call destination.

20. An information processing method for supporting a user who calls a call destination that is a receiving party of a telephone operation, the method performed by a central processing unit that executes processes comprising:

acquiring information recorded during a call between the user and the call destination as call information;

generating support information for the user in the call with the call destination based on the acquired call information;

presenting the generated support information to the user, including, upon the completion of the call, presenting a telephoning memo registration screen that enables the registration of a telephoning memo associated with the call information, the memo being created using a telephoning memo addition object by selecting at least one pre-registered item of the plurality of pre-registered items.

\* \* \* \* \*